US009703023B2

(12) United States Patent
Smith et al.

(10) Patent No.: US 9,703,023 B2
(45) Date of Patent: Jul. 11, 2017

(54) MICROTILED PRISMATIC CUBE CORNER ARTICLES

(71) Applicant: 3M INNOVATIVE PROPERTIES COMPANY, St. Paul, MN (US)

(72) Inventors: Kenneth L. Smith, White Bear Lake, MN (US); Todd A. Ballen, Saint Paul, MN (US); Nelson D. Sewall, Forest Lake, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/777,037

(22) PCT Filed: Mar. 13, 2014

(86) PCT No.: PCT/US2014/025584
§ 371 (c)(1),
(2) Date: Sep. 15, 2015

(87) PCT Pub. No.: WO2014/151368
PCT Pub. Date: Sep. 25, 2014

(65) Prior Publication Data
US 2016/0033694 A1 Feb. 4, 2016

Related U.S. Application Data

(60) Provisional application No. 61/789,030, filed on Mar. 15, 2013.

(51) Int. Cl.
*G02B 5/124* (2006.01)
(52) U.S. Cl.
CPC .................................. *G02B 5/124* (2013.01)

(58) Field of Classification Search
CPC ... G02B 5/122; G02B 5/124; Y10T 428/2457; G09F 13/16
(Continued)

(56) References Cited

U.S. PATENT DOCUMENTS 3,712,706 A  1/1973 Stamm
4,202,600 A  5/1980 Burke
(Continued)

FOREIGN PATENT DOCUMENTS

EP  0342958 A2  11/1989
JP  H11-305017  11/1999
(Continued)

OTHER PUBLICATIONS

International Search Report for PCT International Application No. PCT/US2014/025584, mailed on Oct. 9, 2014, 7pgs.

*Primary Examiner* — James Phan
(74) *Attorney, Agent, or Firm* — Trisha D. Adamson; Veruska C. Dias

(57) ABSTRACT

Cube corner articles such as retroreflective sheeting utilize multiple cube corner arrays in a tiled configuration, each tile containing one array of canted cube corner elements. The tiles may be long and narrow, and the array in each of at least two or three adjacent tiles, or even in every tile, may include at least one lengthwise groove that is parallel to an edge of the tile and parallel to a fixed in-plane axis. Each tile may have a width that is narrow (e.g. 0.2 to 5 mm), and equal to an integer multiple of a lengthwise groove pitch to avoid or reduce ineffective fragmented cube corners along the tile edge. Each array may have a plane of cant and a primary plane of entrance angularity, and the primary planes of entrance angularity for the multiple tiles may be more evenly distributed in azimuthal angle than the planes of cant.

12 Claims, 17 Drawing Sheets

(58) Field of Classification Search
USPC .................. 359/529–533; 428/167, 172, 174
See application file for complete search history.

(56) References Cited

U.S. PATENT DOCUMENTS

| | | | |
|---|---|---|---|
| 4,243,618 A | 1/1981 | Van Arnam |
| 4,478,769 A | 10/1984 | Pricone |
| 4,588,258 A | 5/1986 | Hoopman |
| 4,633,567 A | 1/1987 | Montalbano |
| 4,775,219 A | 10/1988 | Appeldorn |
| 5,156,863 A | 10/1992 | Pricone |
| 5,557,836 A | 9/1996 | Smith |
| 5,565,151 A | 10/1996 | Nilsen |
| 5,691,846 A | 11/1997 | Benson, Jr. |
| 5,764,413 A | 6/1998 | Smith |
| 5,822,121 A | 10/1998 | Smith |
| 5,898,523 A | 4/1999 | Smith |
| 5,914,813 A | 6/1999 | Smith |
| 5,936,770 A | 8/1999 | Nestegard |
| 5,981,032 A | 11/1999 | Smith |
| 6,036,322 A | 3/2000 | Nilsen |
| 6,083,607 A | 7/2000 | Mimura |
| 6,114,009 A | 9/2000 | Smith |
| 6,120,879 A | 9/2000 | Szczech |
| 6,120,881 A | 9/2000 | Smith |
| 6,253,442 B1 | 7/2001 | Benson |
| 6,257,860 B1 | 7/2001 | Luttrell |
| 6,277,470 B1 | 8/2001 | Smith et al. |
| 6,302,992 B1 | 10/2001 | Smith |
| 6,390,629 B1 | 5/2002 | Mimura |
| 6,540,367 B1 | 4/2003 | Benson |
| 6,877,866 B2 | 4/2005 | Nilsen et al. |
| 7,611,251 B2 | 11/2009 | Thakkar |
| 7,862,187 B2 | 1/2011 | Thakkar |
| 8,262,237 B2 | 9/2012 | Smith |
| 2011/0013281 A1 | 1/2011 | Mimura |
| 2013/0034682 A1 | 2/2013 | Free |

FOREIGN PATENT DOCUMENTS

| | | |
|---|---|---|
| WO | WO 96-42025 | 12/1996 |
| WO | WO 99-01786 | 1/1999 |
| WO | WO 99-28770 | 6/1999 |
| WO | WO 2004-061489 | 7/2004 |
| WO | WO 2004-081619 | 9/2004 |
| WO | WO 2011-129831 | 10/2011 |

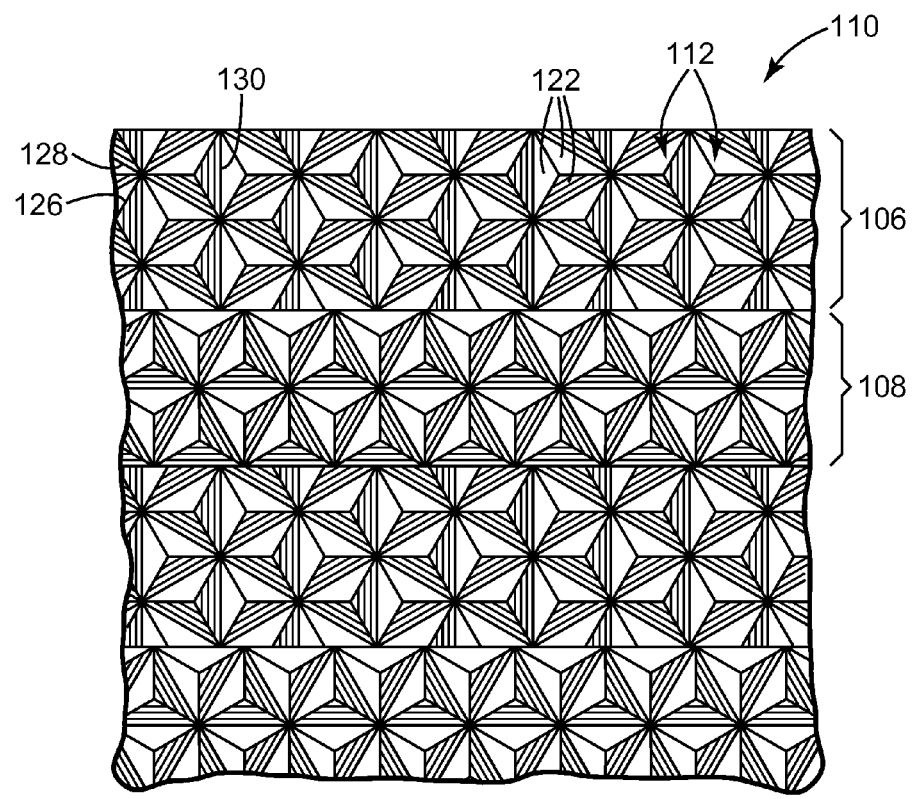
FIG. 1
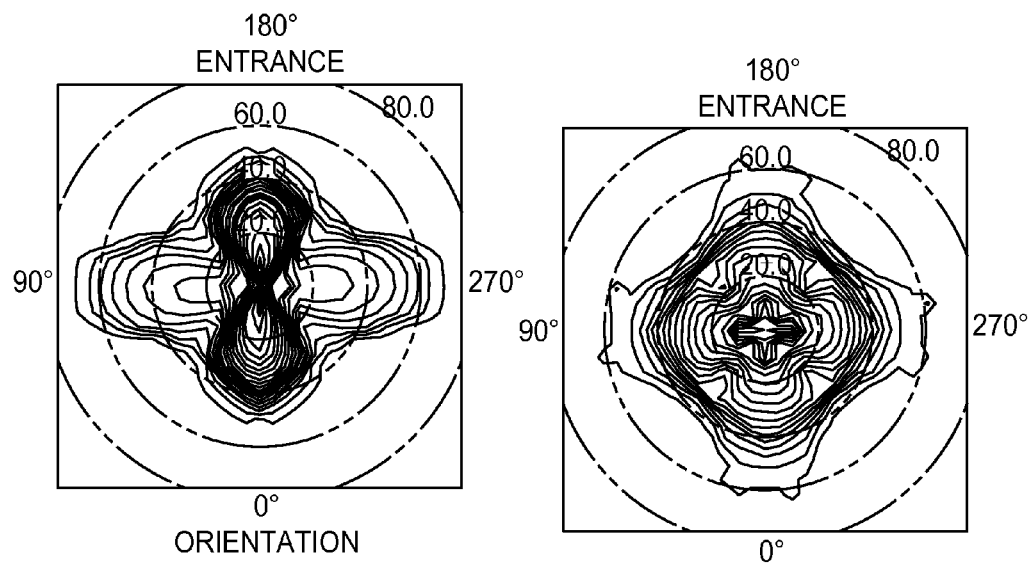
FIG. 1A
FIG. 1B

MICROTILED PRISMATIC CUBE CORNER ARTICLES

CROSS REFERENCE TO RELATED APPLICATIONS

This application is a national stage filing under 35 U.S.C. 371 of PCT/US2014/025584, filed Mar. 13, 2014, which claims priority to U.S. Provisional Application No. 61/789,030, filed Mar. 15, 2013, the disclosures of which are incorporated by reference in their entirety herein.

FIELD OF THE INVENTION

This invention relates generally to retroreflective sheeting and related articles that incorporate cube corner elements, with particular application to such articles in which distinct cube corner arrays are arranged into a plurality of tiles to provide improved retroreflective performance relative to an article that incorporates only one cube corner array. The invention also relates to articles and systems incorporating such cube corner articles, and methods of making and using such articles.

BACKGROUND

Retroreflective cube corner articles are known. Such articles incorporate cube corner elements, each such cube corner having three approximately mutually perpendicular facets of high reflectivity. The reflective facets interact with light to cause each cube corner element to redirect incident light back in the general direction from which it originated, regardless of the angle of incidence of the light. This functionality is useful in applications requiring enhanced visibility, e.g. street and highway signs, traffic control barrels and cones for placement in and along roadways, and vests or other articles of clothing for persons who engage in work or other activities around nighttime traffic. The reflectivity of the facets may be provided by total internal reflection, or by a layer of metal or other reflective material coated onto the facet. It is also known to design the cube corners so that the dihedral angles between the three reflective facets deviate slightly from perfect perpendicularity, so that the retroreflected light deviates slightly from the direction of the incident light. In this way, more of the retroreflected light is likely to be seen by a person whose eye subtends a small but nonzero angle relative to the direction of the incident light. Reference in this regard is made to U.S. Pat. No. 4,775,219 (Appeldorn et al.).

It is known for a given cube corner article to be fabricated using a tool having a structured surface. The structured surface of the cube corner article may be made by microreplication from the structured surface of the tool. The structured surface of the tool is thus an inverted version or negative replica of the structured surface of the given cube corner article. As such, the tool also includes groups of three approximately mutually perpendicular facets, and whether or not the tool itself provides any retroreflectivity of light, it can be considered to be a cube corner article.

It is also known to provide cube corner articles with a tiled configuration, in which distinct cube corner arrays are arranged in a pattern of adjacent regions or zones, referred to herein as tiles. The tiling typically modifies the entrance and orientation performance of the article. Commercially available retroreflective cube corner sheeting uses tiles having, in plan view, the shape of long strips or rectangular areas (inclusive of squares), a minimum characteristic dimension of which is on the order of 0.150 inches (3.8 mm) or more. The orientation of cube corner elements is different between any two adjacent tiles.

Three known retroreflective cube corner articles that employ tiling will now be discussed.

FIGS. 1, 1A, and 1B relate to a tiled retroreflective article discussed in U.S. Pat. No. 5,936,770 (Nestegard et al.). FIG. 1 depicts a magnified view of a portion of the structured surface of a retroreflective cube corner sheeting 110 which is designed to exhibit improved retroreflective performance at high entrance angles in exactly two primary planes, and to exhibit substantially similar retroreflective performance at varying entrance angles in each of the two primary planes. The structured surface includes a plurality of alternating zones which comprise an array of cube corner elements 112. The cube corner elements 112 are disposed as optically opposing matched pairs in an array on one side of the sheeting. Each cube corner element 112 has the shape of a trihedral prism with three exposed planar faces 122. The dihedral angle between the faces 122 is about 90°, but can deviate slightly from 90° as discussed in the '219 Appeldorn patent. The cube corner elements 112 preferably have a canted geometry as disclosed in U.S. Pat. No. 4,588,258 (Hoopman). Such canting defines a single primary plane of improved retroreflective performance at high entrance angles and a single secondary plane of improved retroreflective performance at high entrance angles. The axes of the cube corner elements can be canted in a "backward" or "negative" direction as discussed in U.S. Pat. No. 5,565,151 (Nilsen), or in a "forward" or "positive" direction as discussed in the '258 Hoopman patent.

The structured surface of the sheeting 110 includes a plurality of alternating zones ("tiles") of cube corner arrays disposed at approximately ninety degree orientations. Sheeting 110 may thus be characterized in that it includes a first zone 106 including an array of cube corner elements disposed in a first orientation on the sheeting and a second zone 108 of cube corner elements disposed in a second orientation on the sheeting to define a first primary plane of improved retroreflective performance at high entrance angles and a second primary plane of improved retroreflective performance at high entrance angles which is perpendicular to the first plane.

The first zone 106 extends substantially parallel with a longitudinal edge of sheeting 110. The first zone 106 includes an array of cube corner elements 112 formed by three mutually intersecting sets of grooves including two secondary groove sets 126, 128, and a primary groove set 130. The individual cube corner elements 112 in the array are formed such that their optical axes are canted in a plane perpendicular to the primary groove 130. The cube corner array in first zone 106 thus exhibits a primary plane of improved retroreflective performance which extends perpendicular to the primary groove 130, and perpendicular to the longitudinal edge of the sheeting 110. The individual cube corner elements are canted through an angle of approximately 8.15 degrees with respect to an axis normal to the base of the cube corner element to define base triangle included angles of 55.5 degrees, 55.5 degrees, and 69 degrees. The second zone 108 extends substantially parallel to the first zone 106 along the length of the sheeting, and includes an array of cube corner elements 112 substantially identical to the array disposed in the first zone 106, except that the array in the second zone is disposed at a ninety degree orientation relative to the array in first zone 106. It is said that advantages may be obtained by canting opposing cube corner elements through an angle between about 7 degrees and about 15 degrees (see e.g. the '258 Hoopman patent), but that varying degrees of canting and varying cube sizes can be used.

FIG. 1A depicts the retroreflective characteristics of a single cube corner array in accordance with the '258 Hoopman patent. Such a cube corner array exhibits a single principal plane which exhibits improved retroreflective performance at high entrance angles, represented by the plane extending through the two broadest lobes of the isobrightness contours, and a secondary plane, which exhibits improved retroreflective performance at high entrance angles, represented by the plane which extends through the two shorter lobes of the isobrightness contours. Accordingly, sheeting manufactured to have such a single cube corner array has a single preferred orientation. The embodiment of FIG. 1 is said to overcome this limitation by providing two planes which exhibit improved retroreflective performance at high entrance angles. As disclosed in PCT Publication WO 96/42025 (Smith et al.), backward canted cubes may be configured (e.g., base angles of 50°, 65°, 65°) to have two similar preferred planes of entrance angularity. The two preferred planes of entrance angularity are not necessarily perpendicular to each other.

FIG. 1B is an isobrightness contour graph of retroreflective brightness readings taken from a sample of dual orientation sheeting in accordance with FIG. 1. A description of retroreflective testing geometries and measurement angles is supplied in ASTM E-808-93b, *Standard Practice for Describing Retroreflection* (a more current version of which is designated ASTM-E-808-01 (2009)), and pertinent angles and other geometrical factors are also discussed below in connection with FIG. 4. The measurements of FIG. 1B were taken at a fixed observation angle of 0.33 degrees and a fixed presentation angle of 90 degrees. The entrance angle was varied between 0 and 80 degrees and the sheeting was rotated through a 360 degree range of orientation angles. In FIG. 1B, entrance angles are represented by concentric circles, while orientation angles are represented by numerals extending radially around the graph. The concentric isobrightness contours represent the relative retroreflectance of the retroreflected light; the maximum retroreflectance is represented by the center point on the graph and concentric isobrightness contours representing five percent reductions in retroreflectance relative to the maximum, measured in candelas/lux/meter$^2$.

Referring to FIG. 1B, the retroreflective sheeting of FIG. 1 exhibits exactly four broad lobes of improved retroreflective performance at high entrance angles. These four lobes occur at 90 degree intervals beginning at a zero degree orientation angle (e.g. at 0, 90, 180, and 270 degrees orientation angle). These four lobes define two primary planes of improved retroreflective performance at high entrance angles: the first plane extends through the plane of the sheeting at a 0-180 orientation and the second plane extends through the sheeting at a 90-270 orientation. The sheeting is also said to exhibit substantially similar retroreflective performance across varying entrance angles within these two planes. In use, the sheeting may be oriented in either of two different orientations to enable the sheeting to provide optimal retroreflective performance.

For further design details and variations of retroreflective articles such as that of FIG. 1, the reader is directed to the '770 Nestegard patent.

FIG. 2 is a schematic plan view of another cube corner retroreflective sheeting 270 that employs tiling. The tiled sheeting 270 was sold in commerce by the Stimsonite Corporation of Niles, Ill., under the trade name STIM-SONITE High Performance Grade Reflective Sheeting (Lot 1203W, Product Number 8432170). The tiled sheeting 270 employs a plurality of tiled arrays of backward canted cube corner element matched pairs. The structured surface of the sheeting 270 includes a plurality of groups of cube corner element matched pair arrays positioned at a plurality of distinct orientations relative to a longitudinal edge 272 of the sheeting 270. The cube corner arrays are oriented such that the primary grooves of the arrays lie in planes that are positioned at orientations of 0 degrees, 30 degrees, 60 degrees, and 90 degrees relative to longitudinal edge 272 of sheet 270.

For further details of the tiled sheeting 270, as well as descriptions of other tiled retroreflective articles, the reader is directed to U.S. Pat. No. 5,822,121 (Smith et al.).

FIG. 3 is a tiled cube corner article 310 discussed in patent application publication US 2011/0013281 (Mimura et al.). The cube corner article 310 has a structured surface in which facets thereof form first cube corner arrays 313-1 and second cube corner arrays 313-2 arranged into alternating strip tiles 312-1, 312-2, respectively. The structured surface defines a reference plane, shown as the x-y plane of a Cartesian x-y-z coordinate system. The first cube corner arrays 313-1 have cube corners 314-1 and 315-1. These cube corners are canted. That is, the optical axes (sometimes referred to as the symmetry axis) of each cube corner is tilted with respect to the normal axis of the plane, i.e., with respect to the z-axis. The second cube corner arrays 313-2 have cube corners 314-2 and 315-2, which are also canted. The projections of the optical axes of the various cube corners on the x-y plane are shown in the figure as optical axes 314$d$-1, 315$d$-1, 314$d$-2, and 315$d$-2 for the cube corners 314-1, 315-1, 314-2, 315-2, respectively.

The Mimura reference describes an embodiment in which cube corners 314-1 and 315-1 have base triangles whose ordered interior angles or base angles are (54.918°, 66.659°, 58.423°), and in which cube corners 314-2 and 315-2 have base triangles whose ordered interior angles are (54.918°, 58.423°, 66.659°). Further discussion of base triangles and their ordered angles is provided below. A given one of the cube corners 314-1 and an adjacent one of the cube corners 315-1 form a matched pair of cube corners, because the cube corner 314-1, if rotated 180 degrees about the z-axis, produces a cube corner that has the same cube geometry and the same cube orientation as the cube corner 315-1. A given one of the cube corners 314-2 and an adjacent one of the cube corners 315-2 also form a matched pair of cube corners, for the same reason. However, any given cube corner within the array 313-1 does not have the same cube geometry as, and does not form a matched pair with, any cube corner within the array 313-2.

BRIEF SUMMARY

We have developed a family of cube corner articles in which the structured surface includes different cube corner arrays that are combined in a tiled configuration. Design features of the different cube corner arrays, optionally in combination with design features of their respective tiles, are selected to provide one or more beneficial product characteristics, such as improved orientation uniformity for retroreflected light, improved apparent spatial uniformity of the structured surface, fewer fragmented cube corner elements (or increased surface coverage of non-fragmented cube corner elements), particularly along extended edges of tiles, and ease of manufacture, while being able to realize one, some, or all of these beneficial characteristics in thin flexible cube corner sheeting having a high overall retroreflectivity, if desired. Ease of manufacture has at least two possible aspects. One aspect relates to the speed at which a retroreflective cube corner film can be manufactured, which can be increased by designing the cube corner arrays for most or all of the tiles to have one groove set parallel to the downweb direction of the film web (and preferably also to an edge of the respective tile), so that curable material can be forced into the structured surface of the tool more easily and rapidly. A second aspect relates to reduced cost and increased simplicity in the manufacture of the cube corner tool, which can be realized by the use of cube corner arrays capable of being cut with only one set of three or fewer cutting tools, such that the cube geometry for one array is the same as the cube geometry in a differently oriented array, and/or is a permutation of, the cube geometry in a differently oriented array.

We disclose herein, inter alia, cube corner articles such as retroreflective sheeting that utilize multiple cube corner arrays in a tiled configuration, each tile containing one array of canted cube corner elements. The tiles may be long and narrow, i.e., extended, and the array in each of at least two or three adjacent tiles, or even in most tiles or every tile of the article, may include at least one lengthwise groove that is parallel to an edge of the tile and parallel to a fixed in-plane axis, which axis may be a down-web direction of the article. Each tile may have a width that is narrow (e.g. 0.2 to 5 mm, or less than 1 mm, or from 0.2 to 1 mm), and equal to an integer multiple of a lengthwise groove pitch to avoid or reduce ineffective fragmented cube corners, and vertical surfaces, along the tile edge. Each array may have a plane of cant and a primary plane of entrance angularity, and the primary planes of entrance angularity for the multiple tiles may be more evenly distributed in azimuthal angle than the planes of cant.

The present application further discloses, inter alia, articles having a structured surface that defines a reference plane having an in-plane axis, the structured surface including a plurality of cube corner arrays arranged into a plurality of tiles, including first, second, and third tiles. The first, second, and third tiles are defined by respective first, second, and third cube corner arrays, the first, second, and third cube corner arrays having respective first, second, and third primary planes of entrance angularity, each oriented differently relative to the in-plane axis. The first, second, and third tiles each includes one tile edge parallel to the in-plane axis. Each of the first, second, and third cube corner arrays includes one given groove parallel to the in-plane axis.

The first, second, and third tiles may each be elongated parallel to the in-plane axis. For each of the first, second, and third tiles, the given groove may be one of a plurality of lengthwise grooves that define a lengthwise groove pitch, and each of the first, second, and third tiles may have a width equal to an integer multiple of the respective lengthwise groove pitch. The widths of the first, second, and third tiles may each be in a range from 0.2 mm to 5 mm, or from 0.2 mm to 1 mm, or from 0.5 mm to 1 mm. The plurality of tiles may include additional tiles other than the first, second, and third tiles, the additional tiles having corresponding additional cube corner arrays, and all of the additional cube corner arrays may include one given groove parallel to the in-plane axis.

Cube corners in each of the first, second, and third cube corner arrays may be canted and characterized by a base triangle having an ordered set of base angles, and the ordered sets of base angles for the first and second cube corner arrays may be equal to each other, and the ordered sets of base angles for the first and third cube corner arrays may be permutations of each other. The concept of an ordered set of base angles is discussed further below.

The ordered sets of base angles for the first, second, and third cube corner arrays may alternatively be equal to each other. The plurality of tiles may then further include a fourth tile defined by a fourth cube corner array, and the fourth cube corner array may have a fourth primary plane of entrance angularity that is not parallel to any of the first, second, or third primary planes of entrance angularity, and cube corners in the fourth cube corner array may be canted and characterized by a base triangle having an ordered set of base angles that is a permutation of the ordered set of base angles for the first cube corner array. The fourth tile may be elongated parallel to the in-plane axis, and the fourth cube corner array may include one lengthwise groove parallel to the in-plane axis.

All of the cube corner arrays in the plurality of cube corner arrays may have respective primary planes of entrance angularity, the primary planes of entrance angularity may define at least 4 unique orientations relative to the in-plane axis. The cube corner arrays associated with the at least 4 unique orientations may each include one lengthwise groove parallel to the in-plane axis, and may be characterized by respective ordered sets of base angles, every two of such ordered sets of base angles either being equal to each other or being permutations of each other. The primary planes of entrance angularity may also define at least 5 unique orientations relative to the in-plane axis. The cube corner arrays associated with the at least 5 unique orientations may be characterized by respective ordered sets of base angles, every two of such ordered sets of base angles either being equal to each other or being permutations of each other. The primary planes of entrance angularity may also define at least 6 unique orientations relative to the in-plane axis. The cube corner arrays associated with the at least 6 unique orientations may be characterized by respective ordered sets of base angles, every two of such ordered sets of base angles either being equal to each other or being permutations of each other.

The first and second tiles may have tile edges that meet along a boundary, and facets of a row of cube corners on the first tile near the boundary and facets of a row of cube corners on the second tile near the boundary may collectively form a composite groove, the composite groove being parallel to the in-plane axis. The composite groove may have a composite groove angle that differs from a groove angle of the given groove of the first cube corner array and that also differs from a groove angle of the given groove of the second cube corner array.

The structured surface may provide a uniformity index at a 30 degree entrance angle of at least 4, or at least 5, or at least 6. The structured surface may provide a uniformity index at a 40 degree entrance angle of at least 2, or at least 3, or at least 4, or at least 5.

The present application also discloses articles having a structured surface that includes a plurality of cube corner arrays arranged into a corresponding plurality of tiles, the structured surface defining a reference plane having an in-plane axis. The cube corner array for each of the plurality of tiles have a given groove set whose grooves extend parallel to the in-plane axis, the cube corner array for each of the plurality of tiles have associated therewith a plane of cant and a primary plane of entrance angularity. Unique ones of the primary planes of entrance angularity for the plurality of tiles are more evenly distributed in azimuthal angle than unique ones of the planes of cant.

The unique ones of the primary planes of entrance angularity may have a minimum angular separation PhiMin1 and the unique ones of the planes of cant may have a minimum angular separation PhiMin2, and PhiMin1 may be greater than PhiMin2, or PhiMin1 may be at least 2 times PhiMin2 The unique ones of the primary planes of entrance angularity have a maximum angular separation PhiMax1, and the unique ones of the planes of cant may have a maximum angular separation PhiMax2, and PhiMax1 may be less than PhiMax2. An angular distribution metric PhiADM1 (described below) for the unique ones of the primary planes of entrance angularity may be greater than the corresponding angular distribution metric PhiADM2 (also described below) for the unique ones of the planes of cant.

The plurality of tiles may each be elongated parallel to the in-plane axis. The tiles may have respective widths that are in a range from 0.2 mm to 5 mm, or from 0.2 mm to 1 mm, or from 0.5 mm to 1 mm. The given groove set for each tile may be a lengthwise groove set for such tile. The structured surface may have N unique primary planes of entrance angularity associated respectively with N unique ones of the cube corner arrays, and N may be 4, 5, or 6. The plurality of tiles may include a first, second, and third tile comprising respective first, second, and third arrays of canted cube corners, and the first, second, and third arrays may have associated therewith respective first, second, and third planes of cant no two of which are parallel to each other. For each of the first, second, and third arrays, the given groove set may be a lengthwise groove set that defines a lengthwise groove pitch, and each of the first, second, and third tiles may have a width equal to an integer multiple of the respective lengthwise groove pitch.

The structured surface may provide a uniformity index at a 30 degree entrance angle of at least 4, or at least 5, or at least 6. The structured surface may provide a uniformity index at a 40 degree entrance angle of at least 2, or at least 3, or at least 4, or at least 5.

The present application also discloses articles having a structured surface, the structured surface being segmented into a plurality of tiles, including at least a first, second, and third tile comprising respective first, second, and third arrays of canted cube corners. The first, second, and third arrays have associated therewith respective first, second, and third planes of cant no two of which are parallel to each other. Cube corners in the first, second, and third arrays are characterized by base triangles having respective first, second, and third ordered sets of base angles, and the first and second ordered sets of base angles may be equal to each other, and the first and third ordered sets of base angles may be permutations of each other.

Each of the first, second, and third arrays may have a groove set whose grooves extend parallel to an edge of its respective tile. Each of the first, second, and third arrays may be defined by three sets of parallel grooves that intersect each other to form cube corners. The article may also include a fourth tile comprising a fourth array of canted cube corners, and the fourth array may have associated therewith a fourth plane of cant that is not parallel to any of the first, second, or third planes of cant. The fourth array may be characterized by a base triangle having a fourth ordered set of base angles, and the fourth ordered set of base angles may be the same as the third ordered set of base angles. The structured surface may provide a uniformity index at a 30 degree entrance angle of at least 4, or at least 5, or at least 6. The structured surface may provide a uniformity index at a 40 degree entrance angle of at least 2, or at least 3, or at least 4, or at least 5.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

FIG. 1 is a front or plan view of the structured surface of a tiled retroreflective sheeting that is known;

FIG. 1A is an isobrightness graph showing the retroreflective performance for one of the cube corner arrays or tiles from the sheeting of FIG. 1;

FIG. 1B is an isobrightness graph showing the retroreflective performance for the sheeting of FIG. 1;

FIG. 18 is a multidirectional element group disclosed in a published patent application;

In the figures, like reference numerals designate like elements.

DETAILED DESCRIPTION OF ILLUSTRATIVE EMBODIMENTS

We have developed a family of cube corner articles that can provide a number of beneficial product characteristics, depending upon how many and which of the disclosed design features are used in the article or in its manufacture.

Figure 4:
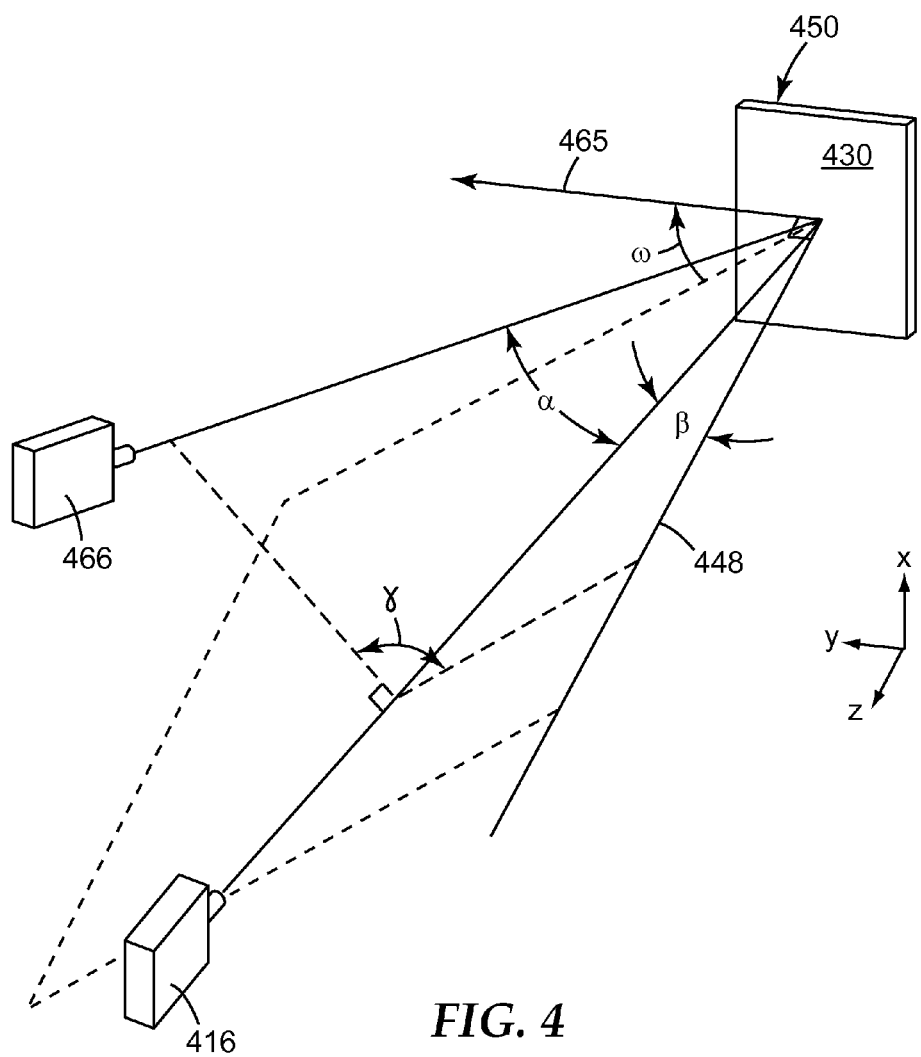
FIG. 4 is a perspective view of a retroreflective article, depicting certain parameters relating to illumination and observation geometry.

Before discussing the design features in more detail, we first turn to FIG. 4 to review certain parameters relating to illumination and observation geometry of retroreflective objects. In the figure, an article 450 has a front surface 430. The article 450 may be a retroreflective sheet or other retroreflective object which may have a structured surface (e.g. at a back or rear side of the object) to provide the retroreflectivity. The article is assumed to lie generally in a reference plane. A Cartesian x-y-z coordinate system is shown in the figure, and the reference plane is assumed to correspond to the x-y plane. Note that if a given article is curved, bent, or otherwise not flat, a portion of the article that is small enough to approximate a plane may be considered in isolation. The article 450 and reference plane also define a surface normal axis 448, this axis being perpendicular to the reference plane and thus parallel to the z-axis. We can also define a particular in-plane axis 465, sometimes referred to as a datum mark. The in-plane axis 465 is of course perpendicular to the normal axis 448, and intersects the normal axis at a point on the front surface or another pertinent portion of the article 450. The in-plane axis 465 may be selected to be a particular direction of interest in the plane of the article 450, e.g., a downweb direction, the groove direction for a particular groove set, or an edge of the article or of a tile of the article.

The article 450 is illuminated by a light source 416, and a detector 466 measures the brightness or intensity of the light reflected by the article 450. The light source 416 and detector 466 are shown at arbitrary positions relative to the article 450. An illumination axis extending from the light source 416 to the article 450 makes an angle $\beta$ with respect to the normal axis 448. The illumination axis and the normal axis 448 define an entrance plane which is perpendicular to the x-y plane and makes an angle $\omega$ with respect to the in-plane axis 465. An observation axis extending from the detector 466 to the article 450 makes an angle $\alpha$ with respect to the illumination axis. The observation axis and the illumination axis define a plane, and this plane makes an angle $\gamma$ with respect to the illumination plane. These angles are referred to as follows:

$\alpha$—observation angle;
$\beta$—entrance angle;
$\gamma$—presentation angle; and
$\omega$—orientation angle.

These angles, and other angles discussed herein, are expressed in units of degrees of arc unless otherwise noted.

The reflective brightness, alternatively referred to as the reflectance, the retroreflectance, or simply the brightness, of an article such as article 450 is designated $R_A$ and is in general a function of all four angles $\alpha$, $\beta$, $\gamma$, and $\omega$. The reflective brightness is the reflected luminous intensity of the article divided by the normal illuminance and by the surface area of the article (or portion thereof being tested), and is expressed in units of candelas per lux per square meter and abbreviated cd/(lux·m$^2$) or cd/lx/m$^2$. If the values of $\alpha$, $\beta$, $\gamma$, and $\omega$ are left unspecified, it is typical to assume an observation angle $\alpha$ of 0.2 degrees, an entrance angle $\beta$ of −4 degrees, a presentation angle $\gamma$ of zero, and an orientation angle $\omega$ of zero. The total light return (TLR) of an article such as article 450 refers to the product of the percent or fractional active area of the cube corner and ray intensity. Unless otherwise specified, the TLR is calculated by integrating all light reflected by the article into a hemisphere whose base coincides with the front surface of the article (see front surface 430 in FIG. 4), every direction vector within the hemisphere having a non-negative z component with reference to the coordinate system of FIG. 4. The hemisphere defines a full range of observation angle $\alpha$ and a full range of presentation angle $\gamma$. In some cases, however, the TLR may be calculated based on light reflected into only a portion of the hemisphere, e.g., a portion corresponding to a detector that subtends a cone whose half angle is 4 degrees in observation angle $\alpha$. The TLR is thus in general a function of only the entrance angle $\beta$ and the orientation angle $\omega$. An isobrightness contour graph, also referred to as an isointensity plot, for an article such as article 450 is a graph such as those of FIG. 1A or 1B in which the reflective performance of the article (which is usually represented by the TLR, but if desired may instead by represented by the retroreflectance $R_A$ at for a particular presentation angle $\gamma$ (typically zero degrees) and observation angle $\alpha$ (typically 0.2 degrees)) is plotted in the form of contour lines as a function of entrance angle $\beta$ and orientation angle $\omega$.

A primary plane of entrance angularity for an article such as article 450 refers to an entrance plane (defined e.g. in terms of orientation angle $\omega$) in which the isobrightness contour graph exhibits lobes of maximum extent. For example, the graph of FIG. 1A above has one primary plane of entrance angularity corresponding to orientation angles 90, 270, and the graph of FIG. 1B above has two primary planes of entrance angularity, one corresponding to orientation angles 90, 270, the other corresponding to orientation angles 0, 180. In cases where there is only one primary plane of entrance angularity, such a plane can also be referred to as a dominant plane of entrance angularity. Thus, for example, the primary plane of entrance angularity in FIG. 1A is also a dominant plane of entrance angularity, because there is no other primary plane of entrance angularity; a secondary plane of entrance angularity (corresponding to orientation angles 0, 180) has lobes of lesser extent than those of the primary plane of entrance angularity.

The uniformity index ("UI") of an article such as article 450 is a measure of how much the TLR of the article changes as a function of the orientation angle ω. For purposes of this document, the UI is calculated by evaluating the TLR in predefined increments such as 10 degrees or 15 degrees over the full range of orientation angle ω. The minimum, maximum, and average of all such TLR values are determined. The UI is then calculated to equal the average TLR value divided by the difference between the maximum and minimum TLR values. The UI is only a function of entrance angle β.

We return now to our discussion of design features of tiled cube corner articles which we have found can be used in unique combinations to provide a number of beneficial product characteristics. As noted above, numerous cube corner articles having tiled configurations have been previously disclosed. Many such articles have also been manufactured, sold, and used in commerce. As such, a large number of users have found them to be satisfactory for their intended purpose.

Despite the widespread acceptance of tiled cube corner products in the marketplace generally, we have considered whether any challenges or hurdles exist to the even wider adoption of such articles. Challenges and hurdles we identified were not necessarily recognized by others as "problems" associated with tiled cube corner articles. In the course of this work we also became aware of advantages or benefits that could be obtained through the use of unique combinations of design features, as explained elsewhere herein, but again these advantages or benefits were not necessarily associated with any particular "problems" recognized by others.

One challenge we identified was the degree of non-uniformity of the isointensity plot with respect to orientation angle. For example, for the tiled cube corner sheeting associated with the isointensity plot of FIG. 1B, the entrance angularity in the vertical and horizontal entrance planes (corresponding typically to 0 and 90 orientation) is very similar. In other orientations, however, such as at an angle 45 degrees from horizontal, very different entrance angularity is obtained. Such tiled sheeting exhibits non-uniform retroreflective performance over the full range 0 to 180 degrees in orientation angle, particularly in comparison to sheeting that utilizes a layer of glass beads rather than cube corner elements to provide retroreflection. Beaded retroreflective sheeting is still used in many applications, and one challenge to consider in order that more tiled cube corner sheeting can replace beaded sheeting is obtaining better uniformity in retroreflective performance as a function of orientation angle. Due to the circular symmetry of glass beads, beaded sheeting typically has high uniformity in its retroreflective performance over the full range of orientation angles.

Another challenge, particularly if one considers using tiled cube corner articles in applications that currently use beaded retroreflective sheeting, relates to the apparent spatial uniformity of the article. Beaded sheeting typically has a high degree of spatial uniformity; that is, even at relatively close viewing distances, such sheeting typically exhibits little or no significant differences in visual appearance at different places across the surface of the sheeting. However, tiled cube corner articles such as that associated with FIG. 1B have a visual appearance that is noticeably spatially non-uniform (striped) when viewed from distances closer than roughly 10 to 20 feet (3 to 6 meters). Such spatial non-uniformity is not considered objectionable or problematic in many applications, but we have observed that it may pose a challenge or hurdle to the wider application of tiled cube corner articles. The closer viewing distances, i.e., closer than roughly 10 to 20 feet (3 to 6 meters), can commonly occur when a buyer of beaded sheeting evaluates the sheeting in connection with a purchase decision, e.g. where the sheeting is to be used in motor vehicle license plates. The visual non-uniformity at the closer distances is due in part to the width or other characteristic minimum transverse dimension of the individual tiles. Most tiled cube corner products have a tile width of at least 0.150 inches (3.8 mm), and more typically 0.375 inches (9.5 mm). Smaller dimensions and narrower tiles, e.g., widths of 0.040 inches (1 mm) or less, can be used to help provide an appearance that is more visually uniform. However, such narrow widths can be difficult to work with when using conventional electric discharge machining (EDM) to cut a structured surface tool into individual strips, and laying the strips into place alongside each other using conventional lay-up techniques to produce a tiled cube corner tool. The cross-sectional aspect ratio (the height or thickness divided by the width) of such individual narrow strips can achieve values of about 1 or less, and as a result, the individual strips can resemble and behave like a wire. As such, they can tend to curl or bend, and consequently can be difficult to hold in close registration with other narrow strips or tiles during the lay-up process.

Another challenge, which also contributes to visual non-uniformity of the tiled cube corner article, relates to the degree to which the orientations of grooves in adjacent tiles differ. An extreme difference in the orientations of grooves in adjacent tiles can amplify the perceived difference in visual appearance between such tiles as noticed by a human observer. In contrast, providing grooves within neighboring tiles that have the same or similar orientations, e.g., parallel to edges of the tiles and to a particular in-plane axis, can reduce the difference in visual appearance between tiles, thus increasing the visual uniformity, and decreasing the visual non-uniformity, of the tiled article.

Another challenge is related to the manner in which individual tiles are cut (whether by EDM or any other suitable technique) in preparation for lay-up of the tiled tool, which manner of cutting affects the integrity and effectiveness of cube corners located along the edges of the tiles. Refer e.g. to the tiles or zones 106 in FIG. 1. In those tiles, structures located adjacent to the extended edges of the tiles possess less than all three fully intact facets of a cube corner, in comparison to other cube corners in the array. Such structures are referred to herein as fragmented cube corner elements. The missing facets (or portions thereof) cause such structures to be wholly or partially ineffective in comparison to the intact (non-fragmented) cube corners in the array. Cutting some or many of the tiles in a way that results in numerous fragmented cube corner elements, i.e., structures that are the same as cube corner elements elsewhere in the array except that a portion of the cube corner element is severed at the edge of the tile and is thus missing from the tile, is undesirable for two reasons. First, the fragmented cube corners detract from the retroreflective brightness of the tiled article, in proportion to the fraction or percentage of the overall surface area of the tiled article that is occupied by the fragmented cube corners. Second, vertical or near-vertical walls are created in the fragmented cube corner elements along the edge of the tile. Such vertical walls may cause separation problems when subsequent multigenerational tooling copies are fabricated or plated.

The degree to which the orientations of grooves in adjacent tiles differ, already mentioned above with respect to visual non-uniformity, also has an impact on another challenge, which relates to ease of manufacture. Thus, we have found that designing the tiled article such that most or all of the tiles have one groove set aligned with a particular in-plane direction, and carrying out the manufacturing so that that in-plane direction is parallel to the direction of flow of a curable material (such as a flowable polymer or polymeric precursor) into a cube corner cavity tool that possesses the tiled geometry (such as a cylinder or drum with an appropriately configured outer surface), the curable material can reliably and completely fill or replicate the structure with high fidelity more easily, and therefore also at faster line speeds, than would otherwise be the case. The flow direction of the curable material can be defined by the direction of relative motion between the tool and the fluid source, e.g., a coating die or a rolling bank of fluid material, this direction also preferably being the down-web direction of the manufactured cube corner sheeting or other article. The in-plane direction is also preferably parallel to at least one edge of most or all of the tiles in the article.

The disclosed tiled cube corner articles need not contain product characteristics designed to address every one of the challenges mentioned above or elsewhere herein; instead, they may contain only some such characteristics. Some of the characteristics are synergistic. For example, if the tiled article is designed so that most or all of the tiles have one groove set aligned with a particular in-plane direction, the visual uniformity can also be increased, and the product may be manufactured easier and faster. Furthermore, if the article is also designed so that the in-plane direction is aligned with an edge of most or all of the tiles, then by making the widths of the tiles equal to integer multiples of the pitch of the grooves that are aligned with the tile edge, and by making the outer groove vertices for each tile coincide with the tile edges, the formation of fragmented cube corners along those edges can be avoided or minimized.

Thus, cube corner tooling fabrication can be carried out to resolve some or all of the above-mentioned challenges.

In one approach, a single type of cube geometry can be used to produce three different types of tiles whose arrays have three different cube orientations respectively. Reference in this regard is made to the arrangement 510 of FIG. 5. By cube geometry, we refer to the characterization of a cube corner, or a matched pair of cube corners, or an array of such cube corners, in terms of the ordered angles of a base triangle associated with the cube corner(s), as discussed further below. The arrangement 510 of FIG. 5 has three cube corner arrays: 513-1, 513-2, and 513-3. In each one of these arrays, the cube corners are formed or defined by three intersecting sets of parallel grooves. In array 513-1, grooves 517-1, which are all parallel to a groove direction 517A, intersect with grooves 518-1, which are all parallel to groove direction 518A, and also intersect with grooves 519-1, which are all parallel to groove direction 519A. In the depicted embodiment, the groove directions and pitches are selected to form matched pairs of forward canted cubes, with groove directions 518A, 517A forming an angle of 56 degrees, groove directions 517A, 519A forming an angle of 56 degrees, and groove directions 519A, 518A forming an angle of 68 degrees. The cube corners in this array thus have a cube geometry of (56, 56, 68). These intersection angles should be considered as illustrative but not limiting. Moreover, the optical axes of the cubes are canted in a plane (or set of parallel planes) referred to as a plane of cant, which in this case is perpendicular to the groove direction 517A. When this cube geometry is implemented in a transparent material of refractive index 1.59, such as polycarbonate, the result is an isointensity plot 502A. The isointensity plot exhibits a primary plane of entrance angularity 503A; in the present case, this plane coincides with the plane of cant for the array 513-1.

In the array 513-2, grooves 517-2, which are all parallel to a groove direction 517B, intersect with grooves 518-2, which are all parallel to groove direction 518B, and also intersect with grooves 519-2, which are all parallel to groove direction 519B. The groove directions and pitches are again selected to form matched pairs of forward canted cubes, with groove directions 518B, 517B forming an angle of 56 degrees, groove directions 517B, 519B forming an angle of 56 degrees, and groove directions 519B, 518B forming an angle of 68 degrees. The cube corners in this array thus have a cube geometry of (56, 56, 68), i.e., the same cube geometry as that of array 513-1, but in a different orientation as exhibited by the relative azimuthal rotation between arrays 513-1, 513-2. The optical axes of the cubes in array 513-2 are canted in a plane (or set of parallel planes) referred to as a plane of cant, which in this case is perpendicular to the groove direction 517B. When this cube geometry is implemented in the same transparent material of refractive index 1.59, the result is an isointensity plot 502B. The isointensity plot exhibits a primary plane of entrance angularity 503B, which coincides with the plane of cant for the array 513-2.

In the array 513-3, grooves 517-3, which are all parallel to a groove direction 517C, intersect with grooves 518-3, which are all parallel to groove direction 518C, and also intersect with grooves 519-3, which are all parallel to groove direction 519C. The groove directions and pitches are again selected to form matched pairs of forward canted cubes, with groove directions 518C, 517C forming an angle of 56 degrees, groove directions 517C, 519C forming an angle of 56 degrees, and groove directions 519C, 518C forming an angle of 68 degrees. The cube corners in this array thus have a cube geometry of (56, 56, 68), i.e., the same cube geometry as that of arrays 513-1 and 513-2, but in a different orientation as exhibited by the relative azimuthal rotation between arrays 513-1, 513-2, 513-3. The optical axes of the cubes in array 513-3 are canted in a plane (or set of parallel planes) referred to as a plane of cant, which in this case is perpendicular to the groove direction 517C. When this cube geometry is implemented in the same transparent material of refractive index 1.59, the result is an isointensity plot 502C. The isointensity plot exhibits a primary plane of entrance angularity 503C, which coincides with the plane of cant for the array 513-3.

By forming all three arrays 513-1, 513-2, 513-3 with the same cube geometry, but in different orientations, the same groove angles are present in all of the arrays. In this regard, a groove refers to an extended open space formed between inclined surfaces, the inclined surfaces substantially defining two intersecting planes, the two planes intersecting along a line that corresponds to a vertex (e.g. base or bottom) of the groove. The dihedral angle between the two planes is the included angle of the groove, or "groove angle". Minor deviations from perfect planarity with regard to one or both of the intersecting planes, and perfect straightness with regard to the line or vertex, may be present due to unintended variability within manufacturing tolerances and/or due to intentional variability for purposes of providing second order design features. Any such minor deviations would typically be so small as to not be noticeable from direct visual inspection of an image or scale drawing of the pertinent surfaces or lines. An inverted or negative replica of a structured surface containing a groove has an extended solid space corresponding to the extended open space of the groove, and such an extended solid space or "inverted groove" may also broadly be considered to fall within the scope of the term "groove" so that, for generality, grooves and features thereof can be discussed regardless of whether a positive structure or negative (inverted) structure is under consideration. Since the same sets of groove angles, within the margins of error discussed herein, are present in all of the arrays of FIG. 5 (in fact only two unique groove angles are present in each array), the arrays can all be manufactured in the first instance, e.g., fly-cut or ruled on a master substrate of copper or other suitable material, with a single set of diamond tools or other suitable cutting tools. This is advantageous for simplifying the manufacturing process (e.g. minimizing the number of diamond tooling setups) and reducing inventory.

Figure 5:
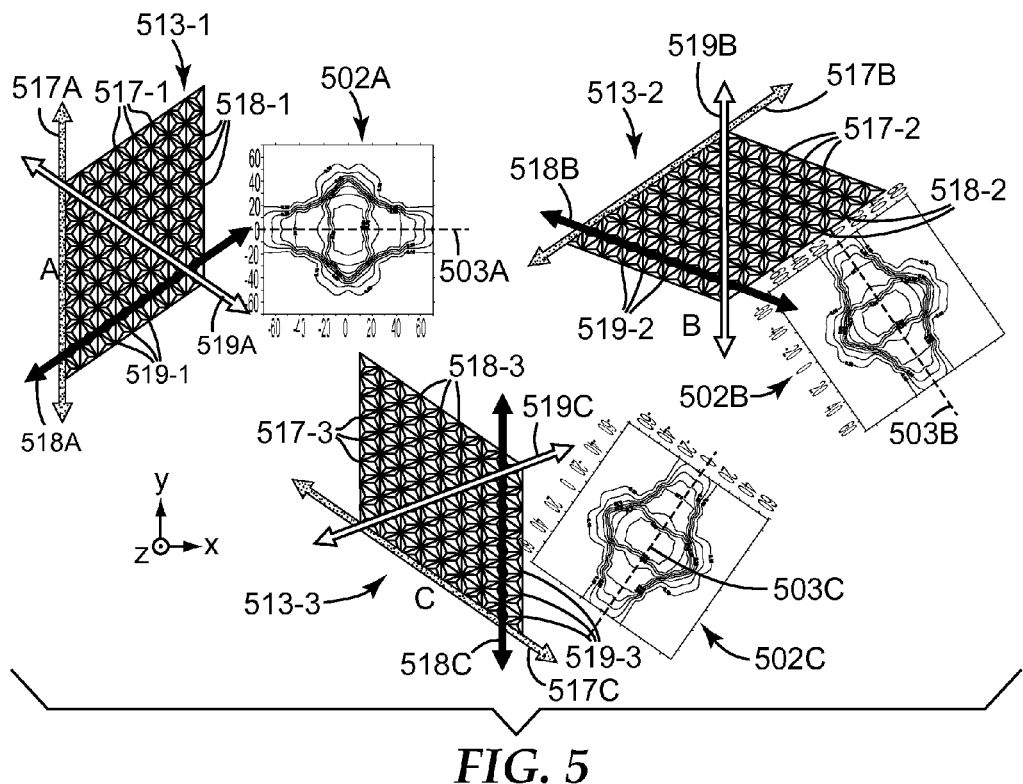
FIG. 5 is a schematic front or plan view of an arrangement in which three cube corner arrays of different orientations can be combined.

The three arrays of FIG. 5 are oriented in a specific manner so that each array includes a groove or groove set whose groove direction is parallel to a particular fixed in-plane axis, even though the arrays, and their respective primary planes of entrance angularity, are oriented in different directions. In this regard, we assume the arrays 513-1, 513-2, 513-3 all lie in, or extend parallel to, an x-y plane of a Cartesian x-y-z coordinate system as shown in FIG. 5. The arrays and the coordinate system have been arranged such that the y-axis, which can be considered a fixed in-plane axis, is parallel to the groove direction 517A of grooves 517-1 in array 513-1, and parallel to the groove direction 519B of grooves 519-2 in array 513-2, and parallel to the groove direction 518C of grooves 518-3 in array 513-3. This condition is satisfied while the planes of cant of the three arrays, as well as the primary planes of entrance angularity of the three arrays, are all oriented in different directions.

Numerous modifications can be made to the arrays of FIG. 5. For example, the groove pitches, groove depths, and cube heights for the respective groove sets and cube corners in the three arrays are assumed to be the same; however, this need not be the case, and the groove pitch, groove depth, and cube height of one array may be changed relative to one or both of the other arrays, all while maintaining the same cube geometries such as (56, 56, 68), and the same respective planes of cant and the same respective primary planes of entrance angularity. The cube corners in one array may thus be larger (e.g. taller and/or wider) than cube corners in another array and may also be the same size or smaller (e.g. shorter and/or narrower) than cube corners in still another array. In other embodiments, different cube geometries can be used in one array relative to one or both of the other arrays, while still maintaining the condition that one groove or groove set in each array has a groove direction parallel to the designated in-plane direction such as the y-axis. The different cube geometries may have positive or negative degrees of cant; furthermore, the plane of cant of a given cube array may or may not coincide with the primary plane of entrance angularity, and the primary plane of entrance angularity may be a dominant plane of entrance angularity, or one of a plurality of primary planes of entrance angularity. Although only 3 distinct cube corner arrays are shown in FIG. 5, a greater number of distinct cube arrays, e.g., 4, 5, or 6 or more, may be used in alternative embodiments. Cube corner arrays may be said to be distinct if their constituent cube corners differ in any material way, e.g., in cube geometry, in cube orientation, and/or in cube size. The 3 or more distinct cube corner arrays may also appear in a repeating sequence of tiles such that each array appears multiple times in the tiled article. Also, unlike the arrays shown in FIG. 5, the cube corners in one, some, or all of the arrays need not be defined by exactly three intersecting sets of parallel grooves, and the cube corners may thus have bases in plan view that are not simple triangular shapes (even though the geometry of the cube corner can still be defined in terms of a base triangle associated with such a cube corner). Reference in this regard is made to U.S. Pat. No. 5,557,836 (Smith et al.), U.S. Pat. No. 5,914,813 (Smith et al.), U.S. Pat. No. 6,083,607 (Mimura et al.), U.S. Pat. No. 6,390,629 (Mimura et al.), and U.S. Pat. No. 6,540,367 (Benson et al.), and PCT publication WO 2004/061489 ( ) and Japanese patent publication JP 11-305017 (Mimura et al.).

For generality, each of the arrays shown in FIG. 5 may be considered to be circumscribed by a tile of any arbitrary shape. The diamond-shaped profiles shown in the figure are one such possible tile shape. In many applications, elongated strip-shaped profiles are of particular usefulness and benefit as tile shapes. In general, however, any suitable tile shape can be used. A "tile" in this regard refers to a single bounded region within which only one cube corner array is present, the one cube corner array extending throughout the region but being discontinued or otherwise disrupted at the boundaries of the region. The cube corner array, in turn, refers to a repeating pattern of cube corners, the repeating pattern having only substantially one type of cube corner, or one type of matched pair of cube corners, where "substantially" takes into account that minor deviations from sameness between cube corners or cube corner pairs may be present due to unintended variability within manufacturing tolerances and/or due to intentional variability for purposes of providing second order design features. Any such minor deviations would typically be so small as to not be noticeable from direct visual inspection of an image or scale drawing of the cube corner array.

Figure 6:
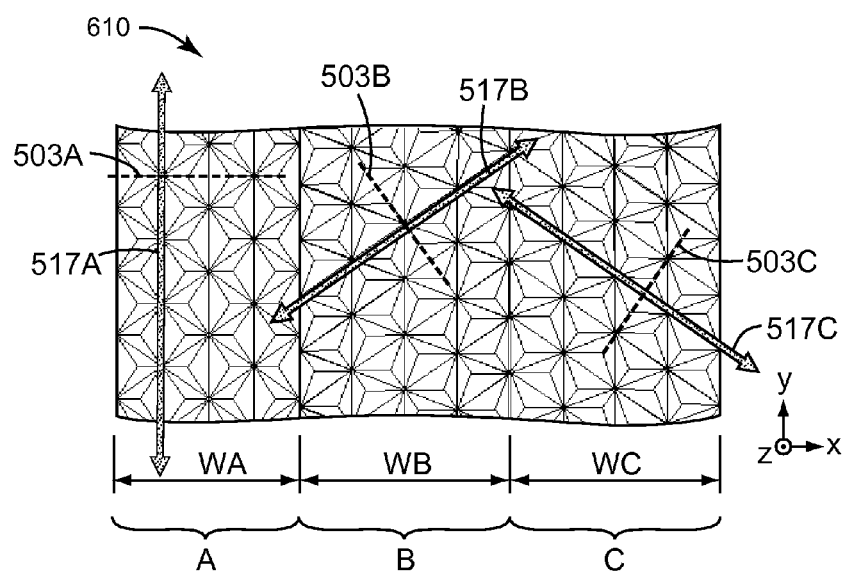
FIG. 6 is a schematic front or plan view of a structured surface comprising three distinct cube corner arrays such as those of FIG. 5, arranged into three corresponding tiles.

The structured surface of a tiled cube corner article 610 is shown in FIG. 6. The structured surface includes three distinct cube corner arrays such as those of FIG. 5, arranged into three corresponding tiles, labeled A, B, and C. For simplicity of discussion and brevity, we assume that tiles A, B, and C include the cube corner arrays 513-1, 513-2, and 513-3, respectively, from FIG. 5. Characteristics of those arrays have been discussed above and will not be repeated here, and like reference numerals designate like elements as between FIGS. 5 and 6. The various modifications of the cube corner arrays discussed above are also assumed to apply equally to this tiled article 610, and variations thereof. The orientations of the various grooves in the arrays are assumed to be the same relative to the in-plane y-axis, such that the array for each of the tiles has one groove or groove set whose groove direction is parallel to the in-plane direction. Despite this, the tiles have primary planes of entrance angularity, see planes 503A, 503B, and 503C, which have different orientations in azimuthal angle so that the tiled article as a whole can have more uniform retroreflective performance over the full range of orientation angles, particularly at high entrance angles, e.g., entrance angles of 30 degrees (or more), 40 degrees (or more), or 50 degrees (or more).

Each of the tiles A, B, C has opposed tile edges that are parallel to the y-axis, and thus also parallel to the groove direction for one of the groove sets in its respective array. These tile edges define a tile width WA for tile A, WB for tile B, and WC for tile C. The widths can be tailored as desired, but preferably they are relatively narrow, e.g. 0.2 to 5 mm, or less than 1 mm, or from 0.2 to 1 mm, to provide for a more spatially uniform appearance at moderate to short viewing distances. The widths WA, WB, WC can, but need not, be equal to each other. The widths WA, WB, WC are also preferably selected to be equal to an integer number of cube corners across the width of the tile. Stated differently, the widths WA, WB, WC are preferably selected to be equal to an integer multiple of the lengthwise groove pitch for the respective tile—i.e., WA is an integer multiple of the pitch of grooves 517-1, WB is an integer multiple of the pitch of grooves 519-2, and WC is an integer multiple of the pitch of grooves 518-3. The pitches of the lengthwise grooves may be the same from tile to tile, or different, and the integer multiple may be the same from tile to tile, or different. In any of these cases, fragmented cube corners can be reduced or eliminated by ensuring that a groove vertex of the lengthwise grooves substantially coincides with each edge of the respective tile. This reduction in fragmented cube corners can be further enhanced by making the tile edges along which the lengthwise grooves run to be as long as possible, or, at least longer than the other edges of the tile (not shown in the fragmentary view of FIG. 6). Stated differently, the tiles may have shapes that are elongated in the direction of the in-plane axis, e.g. the y-axis in FIG. 6. However, in some cases there may be valid reasons for designing the tiles to not be elongated (e.g. square), or even to be elongated along an in-plane direction different from the y-axis, such as along the x-axis in FIG. 6. A "lengthwise" groove or groove set of a given tile may thus refer to a groove or groove set that is at least nominally aligned with a major axis, a minor axis, or any edge of the tile.

The cube corner article 610 may have only the tiles A, B, C shown in FIG. 6, or it may have additional tiles, e.g. in a repeating pattern A, B, C, A, B, C, . . . , or in other repeating or non-repeating patterns, including patterns that include cube corner arrays having the same cube geometry as that of tiles A, B, C, and/or cube corner arrays having different cube geometries compared to those of tiles A, B, C.

The article 610 may be a cube corner tool, and the tiles A, B, C may be strips of a master or replica tool that have been placed side-by-side in the process of laying-up a tiled tool. The strips may be cut from the master or replica tool by EDM or another suitable precision cutting technique. In order to provide strips whose width is on the order of 1 mm or less, e.g. in a range from roughly 0.2 to 1 mm, we have found it particularly helpful, for purposes of handling the pieces and laying them up with minimal curling, bending, or warping, to employ strips or tiles in the form of laminae. A lamina in this regard refers to a thin plate of metal or other suitable material that has opposed major surfaces and a working surface connecting the opposed major surfaces, the working surface being faceted or structured in such a way as to define the cube corner array for a particular tile. Suitable materials typically include copper, brass, or alloys thereof, or other materials that preferably are machinable with minimal burring. Laminae have increased structural integrity, and resist warping or curling, due to their physical height being much greater than their width. Laminae may be individually machined to form grooves on their working surfaces to define suitable cube corner arrays, and groups of laminae may then be held or clamped together in a block to define a tiled structured surface. Laminae may also be machined in groups, e.g. by forming grooves across a plurality of working surfaces while the laminas are held together in a block, and then selecting laminae from different such blocks to form a new group of laminae that define the desired tiled structured surface.

Figure 6A:
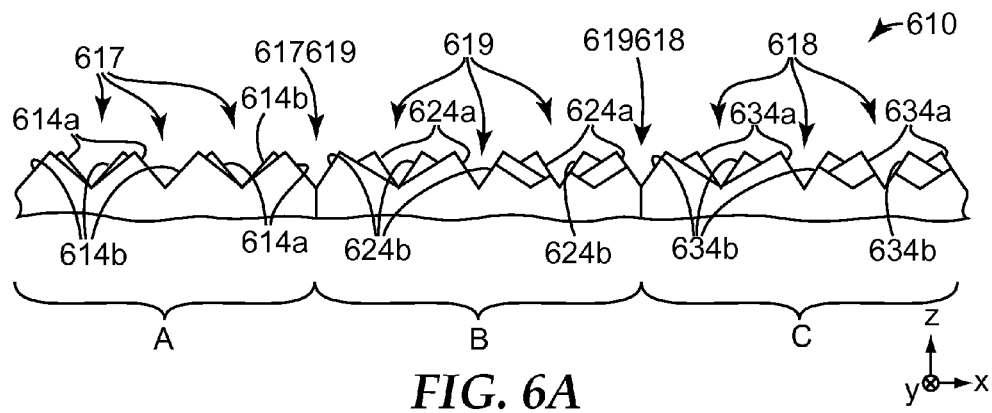
FIG. 6A is a schematic side or elevational view of the cube corner article of FIG. 6.

A side or elevational view of the cube corner article 610 is shown in FIG. 6A. In this view, one can more easily identify grooves in the structured surface that are referred to herein as composite grooves, because they are formed partially by facets of cube corners from one tile and partially by facets of cube corners from an adjacent tile. In this side view, cube corner facets 614a, 614b are identified in the tile A. In the central portion of tile A, pairs of these facets form grooves 617, which correspond to grooves 517-1 in FIG. 5. Similarly, cube corner facets 624a, 624b are identified in the tile B. In the central portion of tile B, pairs of these facets form grooves 619, which correspond to grooves 519-2 in FIG. 5. Cube corner facets 634a, 634b are identified in the tile C. In the central portion of tile C, pairs of these facets form grooves 618, which correspond to grooves 518-3 in FIG. 5. Note, however, that at the boundary at which edges of tiles A and B meet, a single composite groove 617619 is formed. The composite groove 617619 is defined by facets 614a of a row of cube corners on tile A near the boundary and facets 624b of a row of cube corners on tile B near the same boundary. The compound groove 617619 extends along a groove direction that is parallel to the groove direction of grooves 617 and 619. Similarly, at the boundary at which edges of tiles B and C meet, a single composite groove 619618 is formed. The composite groove 619618 is defined by facets 624a of a row of cube corners on tile B near the boundary and facets 634b of a row of cube corners on tile C near the same boundary. The compound groove 619618 extends along a groove direction that is parallel to the groove direction of grooves 619 and 618, and thus also parallel to grooves 617 and to composite groove 617619, as well as to the y-axis. The compound grooves 617619 and 619618 can also be seen in the front or plan view of FIG. 6, but they are not labeled in that figure.

Depending on the cube geometry used in the various arrays, a given composite groove may have a groove angle that is the same as, or different from, the groove angles for the groove sets whose grooves are parallel to the composite groove on the two adjacent tiles between which the composite groove is formed. For example, if we assume the tiles A, B, and C in FIG. 6a contain cube corner arrays from FIG. 5 whose cube geometries are (56, 56, 68), then the groove angle for grooves 617 is nominally 84.832, the groove angle for grooves 619 is nominally 62.938, and the groove angle for grooves 618 is nominally 62.938, and furthermore, the groove angle for composite groove 617619 is nominally 73.885 and the groove angle for composite groove 619618 is nominally 62.938. Thus, the groove angle for the composite groove 617619 differs from those of grooves 617 and 619, but the composite groove 619618 is the same as those of grooves 619 and 618.

Figure 7A:
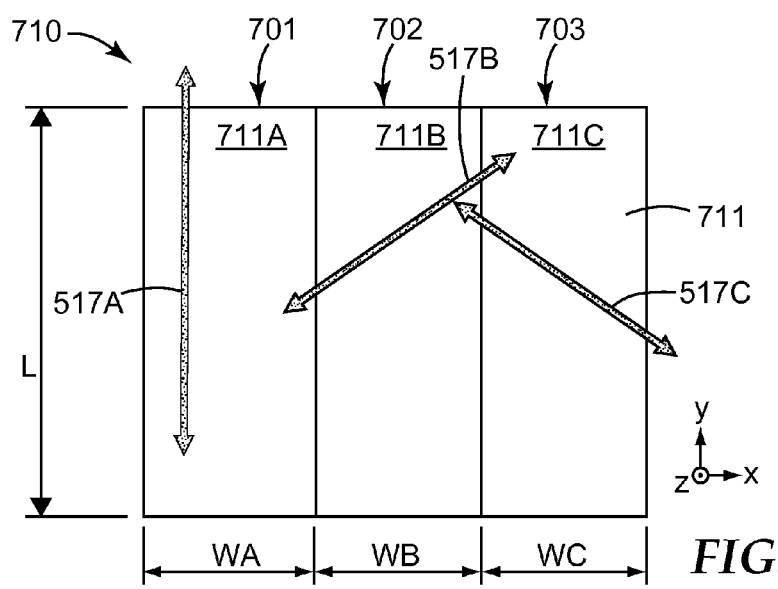
FIG. 7A is a schematic front or plan view of a retroreflective article having three lamina on which respective different cube corner arrays are or can be formed.
Figure 7B:
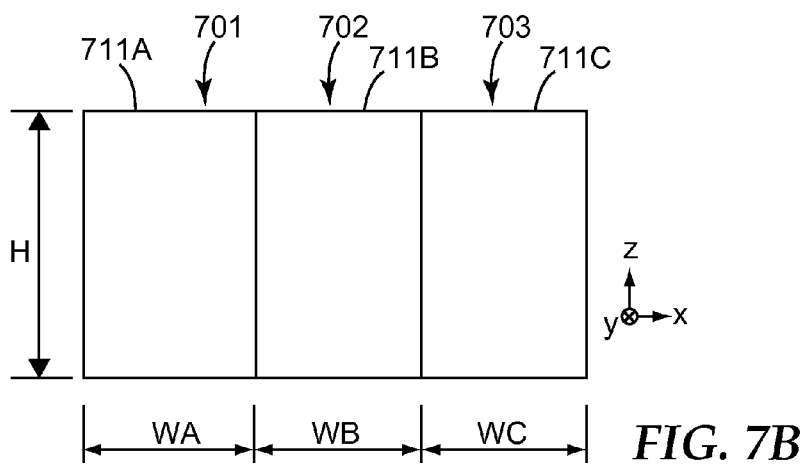
FIG. 7B is a schematic side or elevational view of the same retroreflective article.

A group of laminae that may correspond to the cube corner article 610 of FIG. 6, or to other tiled cube corner articles disclosed herein, is shown schematically in FIGS. 7A and 7B. Three individual laminae 701, 702, 703 are clamped or otherwise held or grouped together to form a cube corner article 710. FIG. 7A is a front or plan view of the article 710, and FIG. 7B is a side or elevational view of the article 710. A Cartesian x-y-z coordinate system is provided in these figures for reference, the coordinate system also being consistent with FIGS. 5 and 6, at least to the extent the structured surface lies in or extends parallel to the x-y plane. Grooves and cube corners (not shown in FIGS. 7A and 7B for simplicity of illustration) are provided in the working surfaces of the laminae to define an overall structured surface 711 of the article 710, the structured surface 711 being segmented into a structured surface 711A in the working surface of lamina 701, a structured surface 711B in the working surface of the lamina 702, and a structured surface 711C in the working surface of the lamina 703. The structured surfaces 711A, 711B, 711C each contains a single cube corner array and defines a distinct tile of the structured surface. The tiles are each elongated along the y-axis, with a length L greater than any one of their respective widths WA, WB, WC. Each tile also has opposed elongated tile edges that are parallel to the (in-plane) y-axis. In an exemplary embodiment, the structured surface 711A contains cube corner array 513-1, the structured surface 711B contains cube corner array 513-2, and the structured surface 711C contains cube corner array 513-3, but changes and modifications can be made as discussed elsewhere herein. The groove directions 517A, 517B, 517B from FIGS. 5 and 6 are thus superimposed on the working surfaces of the respective laminae 701, 702, 703, and the working surface of each lamina contains a groove set whose groove direction is parallel to the opposed edges of the respective tile.

In the side or elevational view of FIG. 7B, the end surfaces of the laminae 701, 702, 703 can be seen, and the height H of the laminae is shown. As mentioned above, the height of a given lamina is much greater than its width to provide the lamina with increased structural integrity relative to, for example, a strip cut out of a typical nickel tooling. The cross-sectional aspect ratio, e.g., H/WA for lamina 701, H/WB for lamina 702, and H/WC for lamina 703, can be tailored as desired but is preferably at least 5, or at least 10, or at least 20. The widths WA, WB, WC may also be tailored as desired, but typically they may all be in a range from 0.2 to 5 mm, or from 0.2 to 1 mm; in one particular embodiment they may all equal 0.635 mm (0.025 inches), but other dimensions can also be used.

The plan view aspect ratio of the lamina or tiles can also be tailored as desired. This aspect ratio is L/WA for lamina 701, and L/WB for lamina 702, and L/WC for lamina 703. The length dimension L is assumed to be parallel to the lengthwise groove directions for most or all of the tiles in the article. This aspect ratio can be at least 10, at least 50, at least 100, or at least 150, but other values, including even values between 0 and 1, can also be used. In this regard, as mentioned above, a "lengthwise" groove or groove set refers to a groove or groove set that is at least nominally aligned with a major axis, a minor axis, or any edge of its associated tile or lamina.

Figure 8:
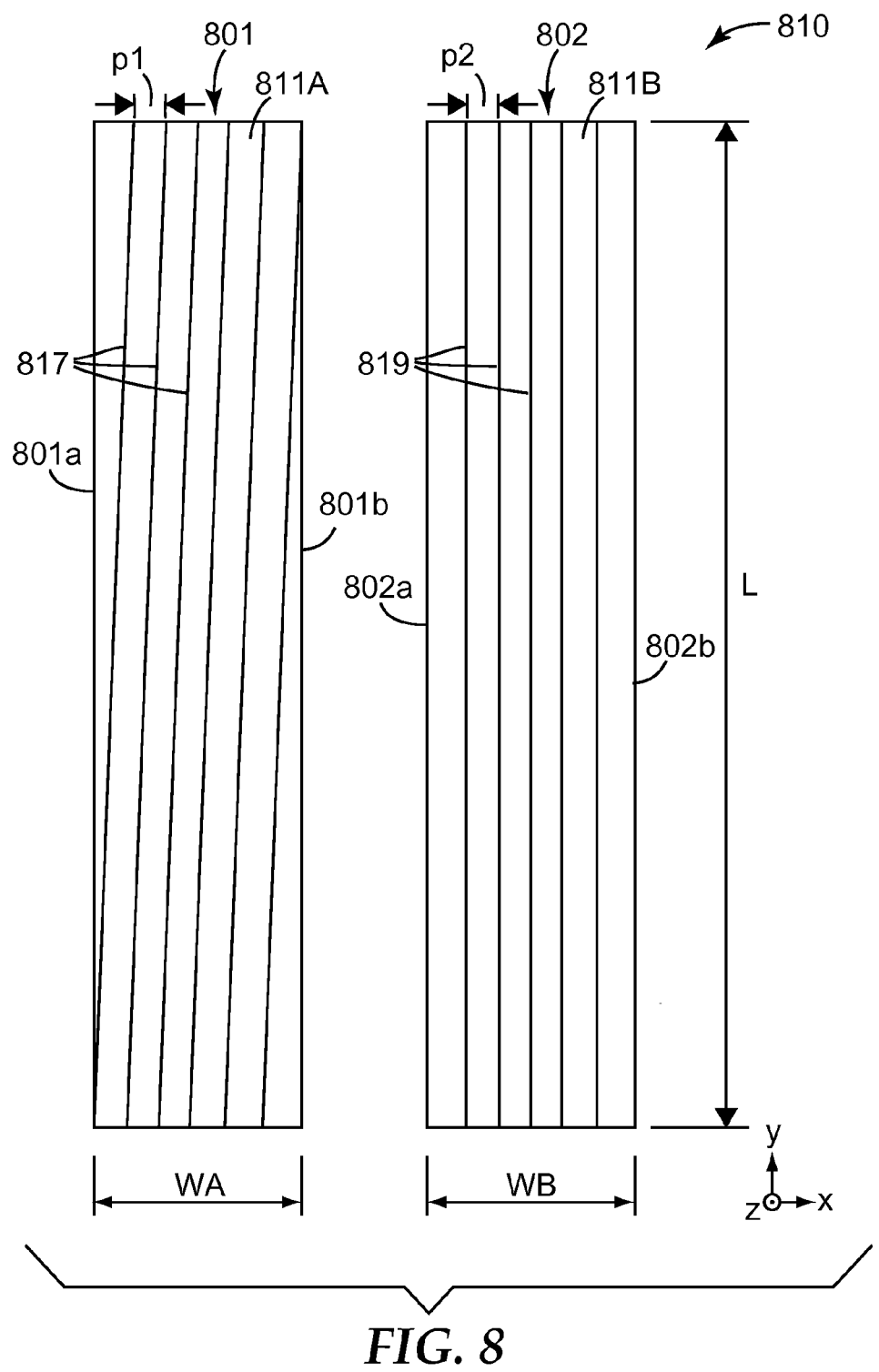
FIG. 8 is a schematic front or plan view of two extended lamina, showing how grooves in a groove set can be parallel or substantially parallel to a major edge of the lamina.

In FIG. 8, a portion of a tiled cube corner article 810 is shown schematically. Only two tiles of the article 810 are shown, which tiles may correspond to respective individual laminae as in FIG. 7A. Thus, laminae 801 and 802 have respective working surfaces 811A, 811B in which respective cube corner arrays are formed in accordance with the teachings herein, only one groove set from these arrays being shown in the figure for each lamina for reduced clutter in the figure. The laminae have respective elongated opposed edges 801a, 801b and 802a, 802b as shown, which can also be considered to be elongated tile edges. These edges lie at the intersection of the working surfaces of the laminae with the major (side) surfaces thereof.

FIG. 8 demonstrates that minor deviations from exact parallelism, whether due to unintended variability within manufacturing tolerances and/or to intentional variability for purposes of providing second order design features, may be present in one or more of the laminae or tiles, and such minor deviations do not negate the design characteristics discussed herein. Thus, the structured surface of each lamina 801, 802 can be said to have one lengthwise groove, or set of lengthwise grooves, whose groove direction is parallel to an edge of the lamina or tile. In lamina 801, such a groove set is the set of grooves 817; in lamina 802, such a groove set is the set of grooves 819. The grooves 819, which have a groove pitch p2, are drawn to be exactly parallel to the edges 802a, 802b. In contrast, the grooves 817, which have a groove pitch p1, are drawn to include a minor deviation from exact parallelism. The grooves 817 deviate (in the illustrated case) by an amount equal to the groove pitch (p1) over the entire length L of the lamina or tile. Such a deviation, although non-ideal, still provides for many cube corners adjacent to the edge that retain some functionality, even though they are fragmented. In the depicted embodiment, more functionality is preserved for such cube corners located near the top and bottom end of the lamina 801. In the case of a typical lamina whose length L is 100 mm and with a groove pitch p1 of 0.2 or 0.1 mm, this corresponds to an angular deviation between either edge 801a, 801b and the groove direction of about 0.11 or 0.057 degrees respectively, or about 0.1 degree or less.

Even in the case of exact parallelism, similar minor translational deviations may occur in the placement of the groove vertex relative to the edge of the lamina or tile. For example, in the lamina 802, the leftmost groove vertex of the grooves 819 is drawn to precisely coincide with the edge 802a, and the rightmost groove vertex is drawn to precisely coincide with the edge 802b. Minor deviations from such coincidence, e.g., typical deviations of less than 30% or 20% or 10% of the pitch of the lengthwise grooves, may occur without negating the design characteristics discussed herein. Such minor deviations may also cause the ratio WB/p1 to deviate very slightly from an exact integer, e.g. by less than 0.2 or less than 0.1. In the case of inexact registration of a groove vertex with the edge of the lamina or tile, the edge may be characterized by a very narrow flat or beveled edge, or by a very narrow strip of fragmented cube corners.

Figure 9:
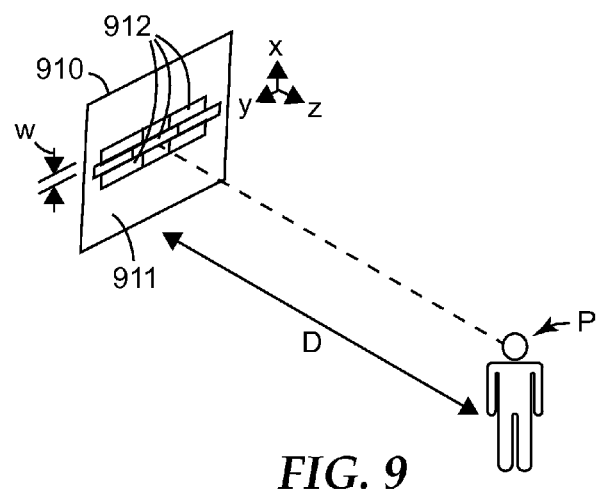
FIG. 9 is a schematic perspective view of a tiled retroreflective article being viewed by an observer.

We include FIG. 9 to demonstrate the effect of the width W, or minimum transverse dimension, of the tiles, and the viewing distance D, on the apparent spatial uniformity of the article. A person P observes or evaluates a cube corner article 910, such as a retroreflective sheeting, from a distance D. The article 910 has a structured surface 911 which lies in or extends parallel to the x-y plane. The structured surface includes distinct cube corner arrays arranged into a plurality of tiles, including tiles 912. The tiles may extend parallel to an in-plane axis such as the y-axis, and may have a characteristic width W. The degree to which the person P observes or notices the individual tiles has a direct effect on the apparent spatial uniformity of the article. As explained above, spatial uniformity is enhanced by providing grooves of the same or similar orientation between adjacent tiles, and/or by reducing the characteristic minimum transverse dimension of the tiles (width W). Reducing the width W of the tiles reduces the angle subtended by the individual tiles at a given viewing distance D, which tends to increase the apparent spatial uniformity. In order to provide good spatial uniformity at viewing distances D closer than roughly 3 to 6 meters (10 to 20 feet), it is desirable to provide a tile width W of less than 1 mm, or in a range from 0.2 to 1 mm. Forming cube corner arrays on lamina as described above can help to achieve such small widths in many practical embodiments.

Figure 10:
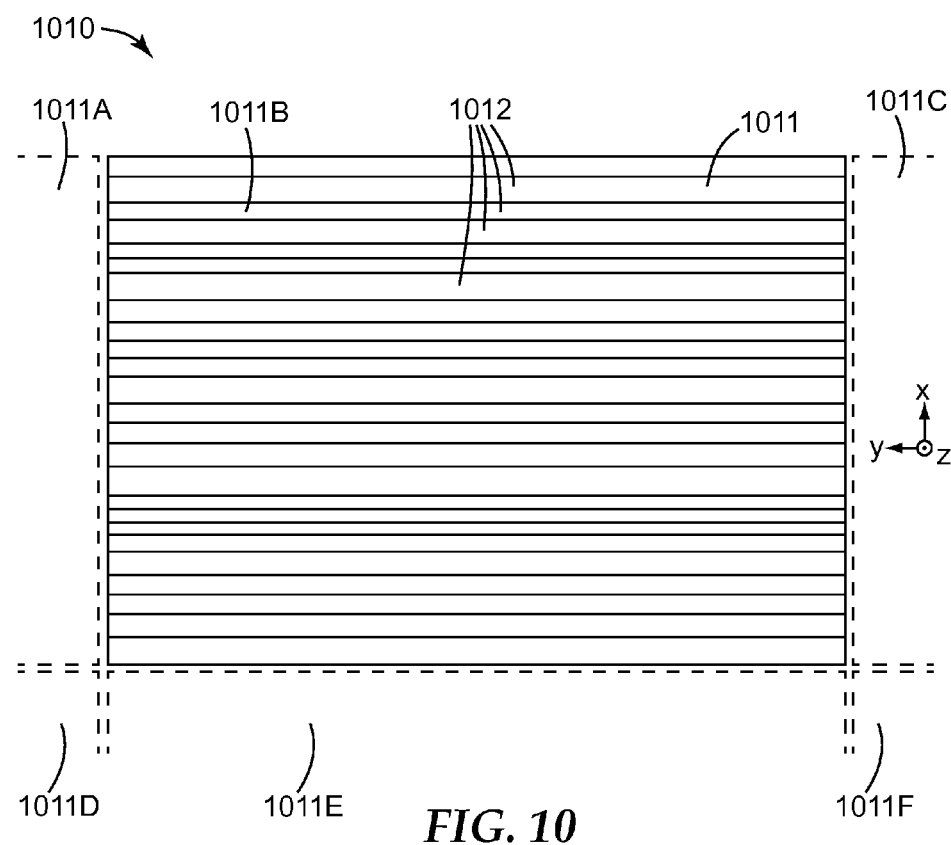
FIG. 10 is a schematic front or plan view of a retroreflective article comprising a plurality of elongated tiles.

Multiple stages of tiling can be used to fabricate a tiled cube corner article, particularly with regard to retroreflective cube corner sheeting which may be very wide and very long. An example of such a cube corner article is shown as article 1010 in FIG. 10. The article 1010 has a structured surface 1011 that includes distinct cube corner arrays arranged into a plurality of tiles 1012 as discussed herein. The tiles are each elongated along an in-plane direction, shown here as the y-direction. The y-direction may correspond to a down-web direction of fabrication of the article 1010, and most or all of the tiles may have one lengthwise groove or groove set whose groove direction is parallel to the y-direction.

The tiles 1012 may be made by forming cube corner arrays in a plurality of lamina or other suitable strips or pieces of tooling, and then arranging different ones of those pieces into a group or bundle to form an initial tiled surface. Such a group is shown in a rectangular-shaped section 1011B of the structured surface 1011. In order to make articles whose structured surface is meant to be larger than such a section, e.g., retroreflective sheeting made on a polymer film manufacturing line, multiple replicas of the section may be made and laid-up alongside each other. The result of such a process provides the article 1010 with adjacent sections 1011A through 1011F, each of which may have the same arrangement of individual tiles 1012 as shown in section 1011B. At the boundaries between sections, cube corner arrays are typically interrupted by a small gap or discontinuity, even if the same type of cube corner array is present on opposite sides of the boundary.

Figure 11A:
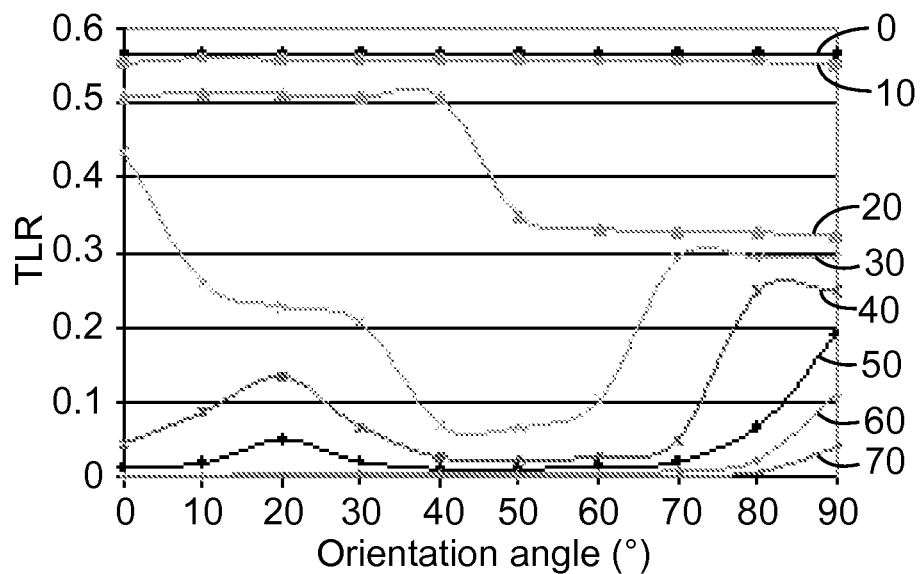
FIG. 11A is a graph showing modeled total light return (TLR) versus orientation angle for a single array of canted cube corners.
Figure 11B:
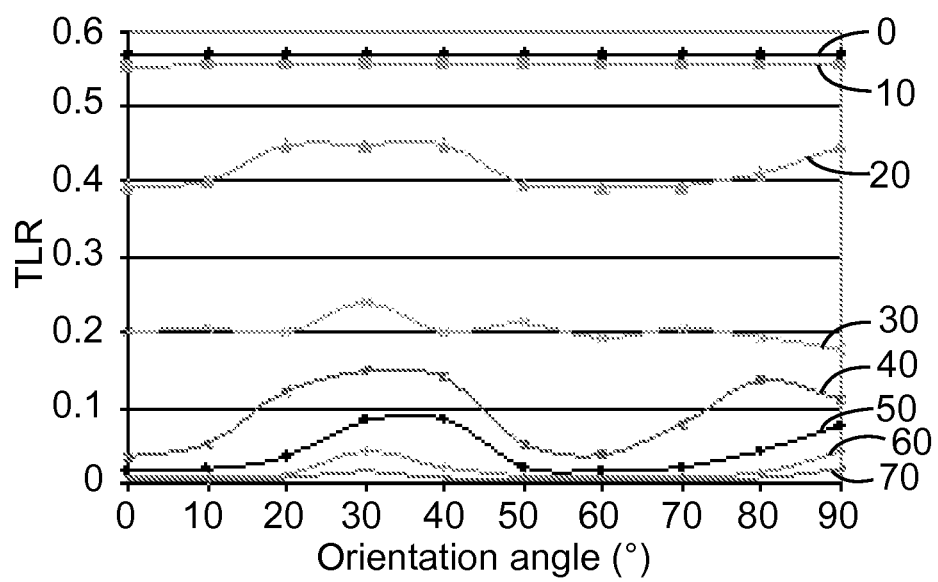
FIG. 11B is a graph showing modeled TLR versus orientation angle for a tiled retroreflective article having three canted cube corner arrays of different orientation, such as those of FIGS. 5 and 6.

The retroreflective performance of a single cube corner array, as a function of orientation angle, is compared to that of an exemplary tiled cube corner article in FIGS. 11A and 11B. FIG. 11A plots the modeled or calculated total light return (TLR) of the single cube corner array. The array is assumed to be formed from three groove sets that intersect each other at angles of 57, 57, and 66 degrees. Cube corners in the array thus have cube geometries of (57, 57, 66). These cubes are forward canted, and have a primary plane of entrance angularity in the plane of cant. The TLR for this array, assuming the article is made of a transparent material of refractive index 1.5, was calculated as a function of orientation angle and entrance angle, and the results plotted in FIG. 11A. In the graph, the various curves are labeled with numbers equal to the entrance angle in degrees. Thus, curve 0 in FIG. 11*a* is for an entrance angle of 0 degrees, curve 10 in the same figure is for an entrance angle of 10 degrees, and so forth. Inspection of the graph reveals that the single array provides fairly uniform retroreflectance as a function of orientation angle for entrance angles of 0 and 10 degrees. For greater entrance angles, particularly entrance angles of 20 degrees and more, non-uniformities become increasingly apparent.

The retroreflective performance of a tiled cube corner article similar in some ways to the cube corner array of FIG. 11A is shown in FIG. 11B. The tiled article used three distinct cube corner arrays arranged into three corresponding tiles as shown in FIGS. 5 and 6 above. Thus, the cube corner arrays in the three tiles were of different orientations, and each contained a lengthwise groove set whose groove direction was parallel to an in-plane axis, but the cube corner arrays all utilized cube corners of the same cube geometry (57, 57, 66) as the single cube corner array of FIG. 11A. The TLR for the tiled article, again assuming a transparent material of refractive index 1.5, was calculated as a function of orientation angle and entrance angle, and the results plotted in FIG. 11B. Just as in FIG. 11A, the various curves in FIG. 11B are again labeled with numbers equal to the entrance angle in degrees. By comparing the graphs of these two figures, one can see a greatly improved orientation uniformity at entrance angles of both 20 and 30 degrees, and somewhat improved orientation uniformity at even higher entrance angles.

Figure 12:
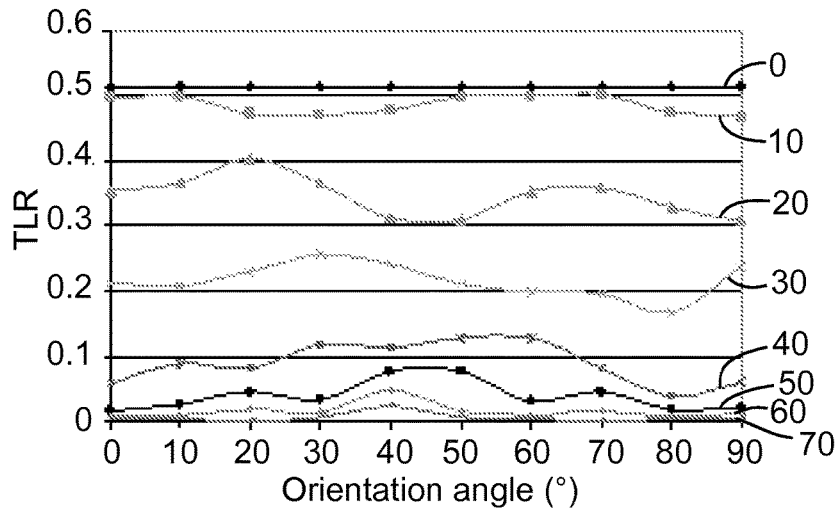
FIG. 12 is a graph showing modeled TLR versus orientation angle for another tiled retroreflective article having three canted cube corner arrays of different orientation.

Another tiled cube corner article was considered. This article was similar to that of FIG. 11B insofar as it was assumed to contain exactly three cube corner arrays arranged into elongated tiles of equal width, and for each array, one of the three groove sets was oriented such that its groove direction was parallel to the in-plane axis of elongation. However, the three groove sets of each array were made to intersect at different angles, such that the three arrays contained canted cube corners of a different cube geometry than that of FIG. 11B, namely, a cube geometry of (50, 62.1, 67.9). Each of the three arrays contained canted cubes of this geometry, but the cube corners in the arrays had different orientations due to the different azimuthal orientations of the three cube corner arrays. The (50, 62.1, 67.9) cube geometry is associated with a base triangle that is scalene rather than isosceles. The TLR for the modified tiled cube corner article was calculated as a function of orientation angle and entrance angle, again assuming a transparent material of refractive index 1.5, and the results are plotted in FIG. 12. Just as in FIGS. 11A and 11B, the various curves in FIG. 12 are labeled with numbers equal to the entrance angle in degrees. In this embodiment, orientation uniformity is further improved relative to the tiled article of FIG. 11B, at least insofar as at an entrance angle of 40 degrees, the TLR in FIG. 12 is more uniform over the full 0 to 90 degree range of orientation angles.

The results for FIGS. 11A, 11B, and 12 assume cube corner articles made of a transparent material of refractive index 1.5, and having structured surfaces as explained above. Increasing the refractive index generally broadens the width of the zones of improved entrance angularity. For example, the horizontal zone of improved entrance angularity in FIG. 1A will become wider (i.e., in the vertical direction its width will increase) with increasing refractive index. Tiling three different orientations will hence tend to become more uniform with respect to orientation as the refractive index increases. In general, the design features discussed herein can be applied to cube corner articles of any suitable refractive index. Furthermore, they can be applied to cube corner articles regardless of the reflection mechanism relied upon in the arrays, i.e., whether the facets of the cube corners are coated with a reflective metal (e.g., aluminum, silver, nickel, or alloys thereof) or other suitable material, or whether the facets of the cube corners are uncoated (e.g. exposed to air or vacuum) and reflect light using the phenomenon of total internal reflection (TIR).

Thus far in the description, the cube geometries of various cube corner elements, and matched pairs and arrays thereof, have been mentioned and discussed. In connection with FIG. 13, for clarity, we provide a more methodical discussion of cube corners and their geometry and orientation. Thus, we present in the figure a plan view of a hypothetical cube corner article 1310 having a hypothetical structured surface 1311, which lies in or extends parallel to the x-y plane of a Cartesian x-y-z coordinate system. For purposes of comparison and discussion, the surface 1311 is shown to contain different individual cube corners 1320, 1330, 1340, 1350, 1360, and 1370. In practice, any given one of these cube corners would typically be present on the structured surface of a given tile in the context of a single cube corner array formed from three intersecting sets of parallel grooves, the array also containing other identical or similar cube corners, including a cube corner that forms a matched pair with the given individual cube corner of interest in FIG. 13.

Each cube corner in the figure is bounded by three non-dihedral edges (which in a cube corner array may coincide with groove vertices), the non-dihedral edges forming a base triangle. (In some cases, the cube corners in a given array may not have three non-dihedral edges that form a recognizable base triangle; in such cases, a base triangle can still be associated with such a cube corner, by considering the faces of the cube corner to be planes, and by then considering the triangle formed by the intersection of those planes with a reference plane parallel to the plane of the structured surface, e.g., the x-y plane.) We characterize the cube geometry of the cube corners in terms of the three interior angles of the associated base triangle, which can be referred to as base angles. However, as shown below, the order in which we express those three base angles can be significant. Therefore, we adopt the convention for purposes of this document of listing the interior angles of the base triangle in a particular order, namely, we list the smallest angle first, and we then list the remaining angles in a clockwise fashion (when viewing the base triangle from a given consistent plan view perspective, e.g., the perspective of FIG. 13 with cube vertices projecting into the plane of the figure) relative to such smallest angle. We refer to the resulting set or group of angles as an ordered set of base angles, or more simply as an ordered set or as ordered angles. If the base triangle is isosceles with two angles smaller than the third, we list the first two (smallest) base angles first in the ordered set. Using this convention, the ordered angles of the base triangles associated with the cube corners shown in FIG. 13, i.e., the cube geometries of such cube corners, are as follows:

cube corner 1320: (50.8, 58.73, 70.47);
cube corner 1330: (50.8, 58.73, 70.47);
cube corner 1340: (50.8, 58.73, 70.47);
cube corner 1350: (50.8, 70.47, 58.73);
cube corner 1360: (54.616, 54.616, 70.768); and
cube corner 1370: (46.2, 66.9, 66.9).

Each of these cube corners is canted, i.e., its optical axis is not orthogonal to the plane of the structured surface. The optical axis is thus tilted relative to the z-axis, and is not parallel to the z-axis. The canted geometry defines a plane of cant for the cube corner (and for the array of which it may be a part), the plane of cant containing the optical axis of the cube corner and the normal direction of the structured surface, i.e., the z-axis. The plane of cant can be identified for each cube corner in FIG. 13 with reference to the bold black arrow, which represents the projection of the optical axis of a given cube corner on the x-y plane. Thus, for example, the cube corner 1320 is shown to have a bold black arrow representing the projection of its optical axis; a plane perpendicular to the x-y plane and containing the bold black arrow represents the plane of cant of such cube corner 1320. The cube corners 1320, 1330, 1340, and 1350 may be said to be sideways canted because the plane of cant is not perpendicular to any side of the base triangle. The cube corner 1360 may be said to be forward canted. The cube corner 1370 may be said to be backward canted.

Figure 13:
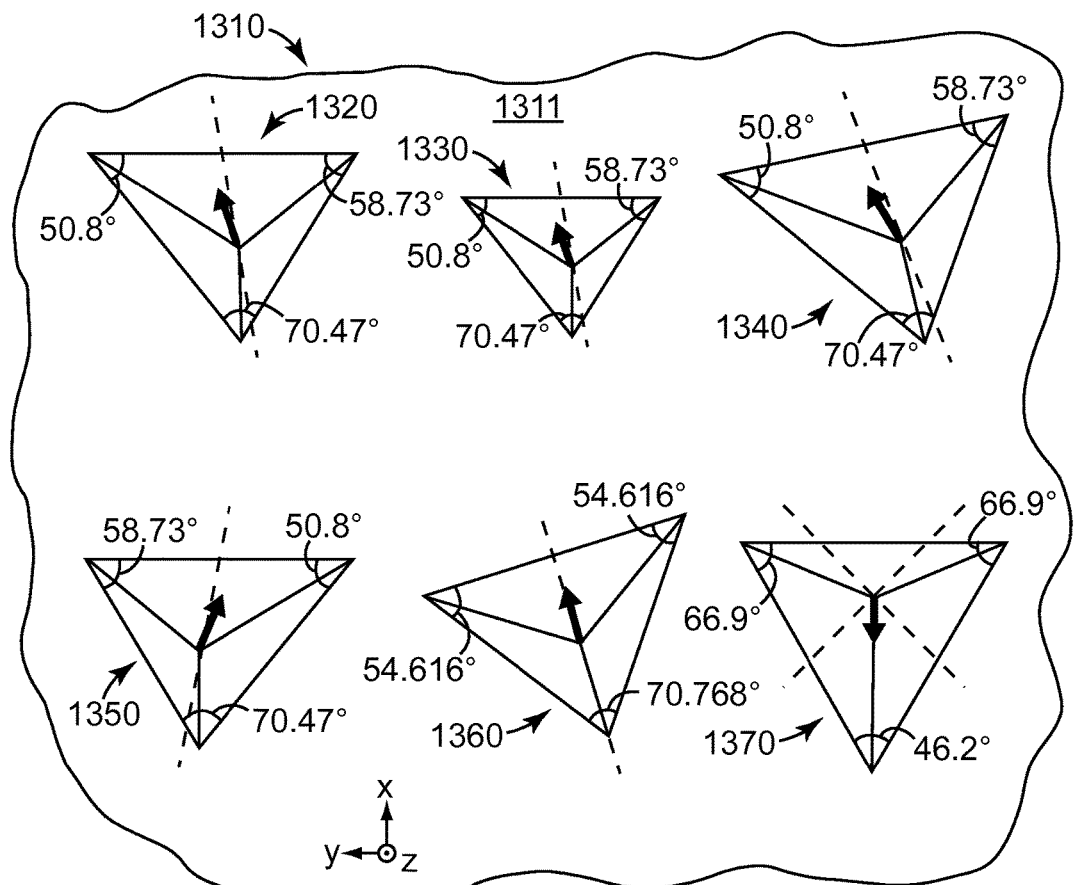
FIG. 13 is a schematic top or plan view of individual cube corner elements, to demonstrate concepts such as cube geometry, cube orientation, plane of cant, and primary plane of entrance angularity.

The canted geometry also provides each cube corner (and the array of which it may be a part) with a primary plane of entrance angularity, as discussed above. The primary lane(s) of entrance angularity have been calculated for each of the cube corners shown in FIG. 13, and the direction of such plane(s) is indicated in FIG. 13 by a dashed line or lines superimposed on the corresponding cube corner. Thus, for example, cube corners 1320, 1330, 1340, and 1350 each have only one primary plane of entrance angularity, and in each of these cases this plane is not parallel to the plane of cant for the cube corner. Cube corner 1360 has only one primary plane of entrance angularity, and it is parallel to the plane of cant. Cube corner 1370 has two primary planes of entrance angularity, neither of which is parallel to the plane of cant.

Cube corners 1320, 1330, and 1340 all have the same cube geometry, because their sets of ordered base angles are equal to each other. Of these cube corners, cube corners 1320 and 1330 also have the same cube orientation, despite the fact that they have different cube sizes and different cube heights. Cube corners 1320 and 1340 have the same cube sizes and heights, but different cube orientations, since their respective planes of cant are not parallel to each other.

Cube corners 1320 and 1360 have different cube geometries, with different sets of ordered base angles, but they may have the same orientation if their respective planes of cant are parallel to each other.

Cube corners 1320 and 1350 have the same cube sizes and heights, but different cube geometries. Even though each of these cube corners has one base angle of 50.8 degrees, and another base angle of 58.73 degrees, and another base angle of 70.47 degrees, i.e., even though every base angle in the base triangle of one cube corner element can also be found in the base triangle of the other cube corner element, they nevertheless have different cube geometries. The different cube geometries can be seen by inspection of the figure, as well as by comparing their respective sets of ordered base angles, which do not match. Note that if one were to rotate the cube corner 1320 azimuthally (about the z-axis) such that its plane of cant was parallel to the plane of cant for cube corner 1350, the respective primary planes of entrance angularity for these cube corners would not be parallel to each other. The cube geometry (50.8, 58.73, 70.47) of cube corner 1320 is thus different from the cube geometry (50.8, 70.47, 58.73) of cube corner 1350.

The unique relationship between the cube corners 1320, 1350 can be expressed by noting that the ordered set of base angles for one cube corner (or an array of such cube corners) is a permutation of the ordered set of base angles for the other cube corner (or array of such other cube corners). For example, the ordered set (50.8, 70.47, 58.73) is a permutation of the ordered set (50.8, 58.73, 70.47), because these ordered sets contain the same angles but in a different order—while adhering to our description of the term "ordered set" as set forth above. Arrays of cube corners having this relationship, at least when they are formed by three intersecting sets of parallel grooves, have the same groove angles and can be formed with a single set of cutting tools. Stated differently, three diamond cutting tools can be used to form the three sets of parallel grooves needed to form an array of cubes like cube corner 1320, and those same three diamond cutting tools (when used in a different order) can be used to form the three sets of parallel grooves needed to form an array of cubes like cube corner 1350, even though cube corner 1350 has a different cube geometry than cube corner 1320. Taking advantage of this relationship, we can provide as many as 6 distinct cube corner arrays in separate tiles of a cube corner article, each array having a different orientation, and each array having a lengthwise groove whose groove direction is parallel to a given in-plane axis, and all of these arrays being capable of fabrication with a single set of three groove cutting tools. Such an embodiment is depicted in FIG. 14.

Figure 14:
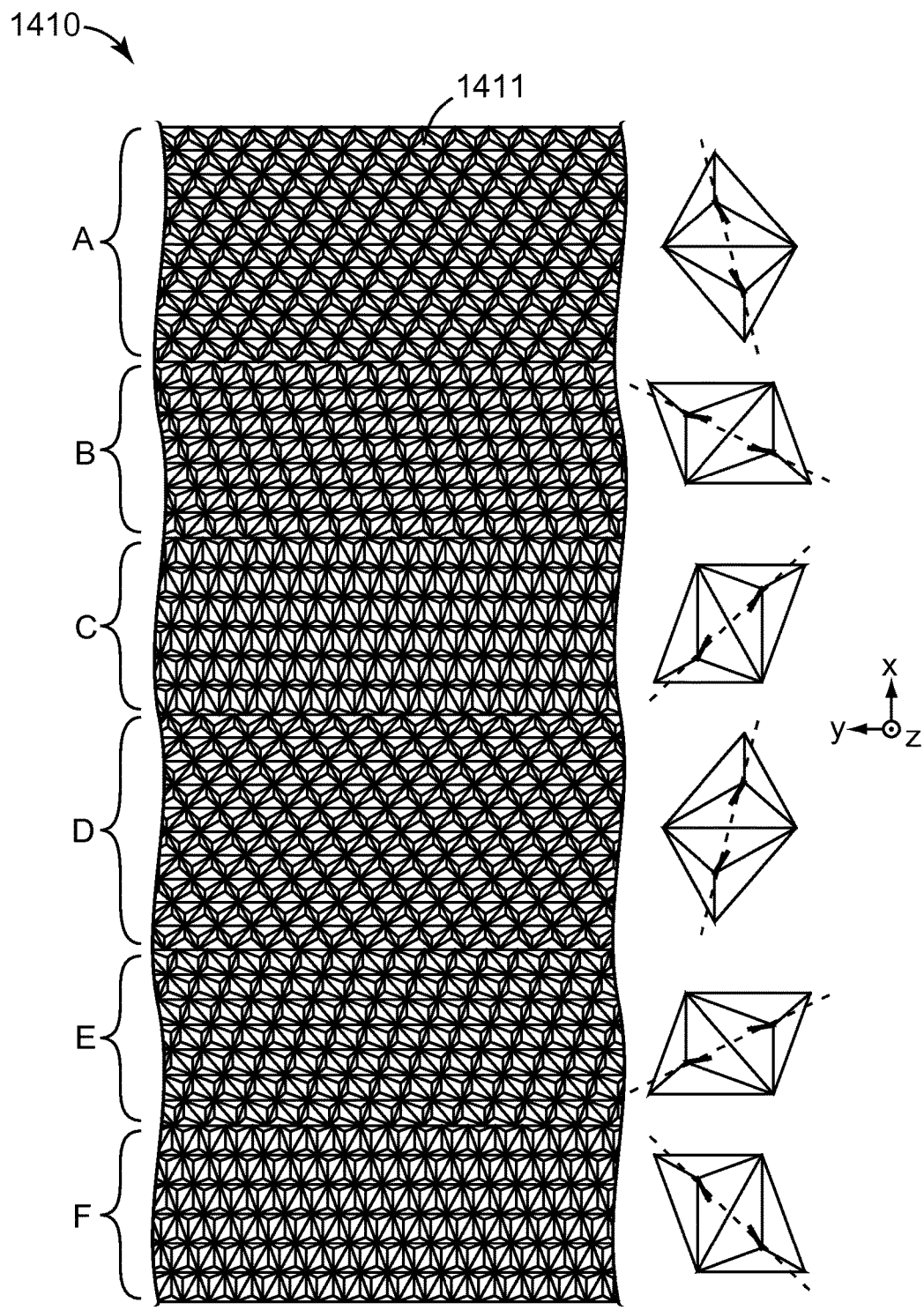
FIG. 14 is a schematic top or plan view of a tiled cube corner article that has six distinct arrays of canted cube corners.

In FIG. 14, a cube corner article 1410 is shown in schematic top or plan view. The article 1410 may be a retroreflective sheeting or a tool associated with its manufacture. The article 1410 has a structured surface 1411 with 6 distinct cube corner arrays arranged into a stack of 6 adjacent tiles, the tiles labeled A, B, C, D, E, F. The tiles are elongated parallel to an in-plane y-axis, and each tile has opposed elongated edges that are also parallel to the y-axis. In alternative embodiments, the tiles need not be elongated along the y-axis, and/or need not have edges parallel to the y-axis. Each tile has one array of canted cube corner elements formed by three intersecting sets of parallel grooves. For each tile, one of its three sets of grooves is a set of lengthwise grooves whose groove direction is parallel to the y-axis. Each tile also has a tile width (measured in the x-direction) that is equal to an integer multiple of a lengthwise groove pitch of its lengthwise grooves, such that fragmented cube corners are substantially absent at the elongated edges of the tiles. The tile widths are not uniform. Tiles A and D have tile widths that are equal to each other but greater than the tile widths of tiles B, C, E, and F, which are also equal to each other.

For reference purposes in the figure, one enlarged matched pair of cube corners is shown on the right hand side of each tile. In every instance, the enlarged matched pair is representative of the matched pairs of cube corner elements in its associated cube corner array. Thick black arrows are included in each enlarged matched pair to indicate the projections of the optical axes of the cube corners in the x-y plane, in similar fashion to FIG. 13. These thick black arrows thus provide an indication of the direction of the plane of cant for each array. Also in keeping with FIG. 12, dashed lines are superimposed on each enlarged matched pair of FIG. 14 to indicate the direction of the primary plane of entrance angularity for the matched pair and its associated array.

The cube corners of tiles A, B, and C all have cube geometries of (49, 61, 70). The cube corners of tiles D, E, and F all have cube geometries of (49, 70, 61). Thus, the ordered set of base angles for the cube corners of any one of tiles A, B, or C is a permutation of the ordered set of base angles for the cube corners of any one of tiles D, E, and F, and vice versa. Furthermore, one set of three diamond cutting tools can be used to form the three sets of parallel grooves needed to form the array of cubes for every one of tiles A, B, C, D, E, and F.

Compound grooves, although not labeled in FIG. 14, can be readily seen in the figure. One compound groove appears at the boundary of tiles A and B, another appears at the boundary of tiles B and C, another appears at the boundary of tiles C and D, another appears at the boundary of tiles D and E, and another appears at the boundary of tiles E and F. In each case, these compound grooves are parallel to the y-axis, and parallel to the groove direction of a groove set in each tile adjacent to the given compound groove. Furthermore, in each case, the compound groove has a groove angle that is different from the groove angle of lengthwise grooves in each of the two tiles that bound the given compound groove.

Numerous modifications can be made to the cube corner article 1410. The widths and shapes of the tiles can be changed. The tiles can be rearranged in different orders. One or more of the tiles that are present in the article 1410 can be removed, and one or more tiles having different cube corner arrays, including one or more canted cube corner arrays as well as one or more non-canted cube corner arrays, can be inserted or otherwise added. In such a modification, at least two tiles may have cube corner arrays whose cube geometries are the same but whose orientations are different, and at least two tiles may have cubes whose sets of base angles are related by a permutation. Different angles of intersection for the sets of parallel grooves, and different corresponding base angles for the cube corners, can be used. The groove depths for grooves in a given groove set may all be the same, or they may all be different from each other, or some may be the same and some different. Alternatively or in addition, the groove depth(s) used in a first groove set may be the same as, or different from, the groove depth(s) used in a second groove set that intersects the first groove set.

Figure 15:
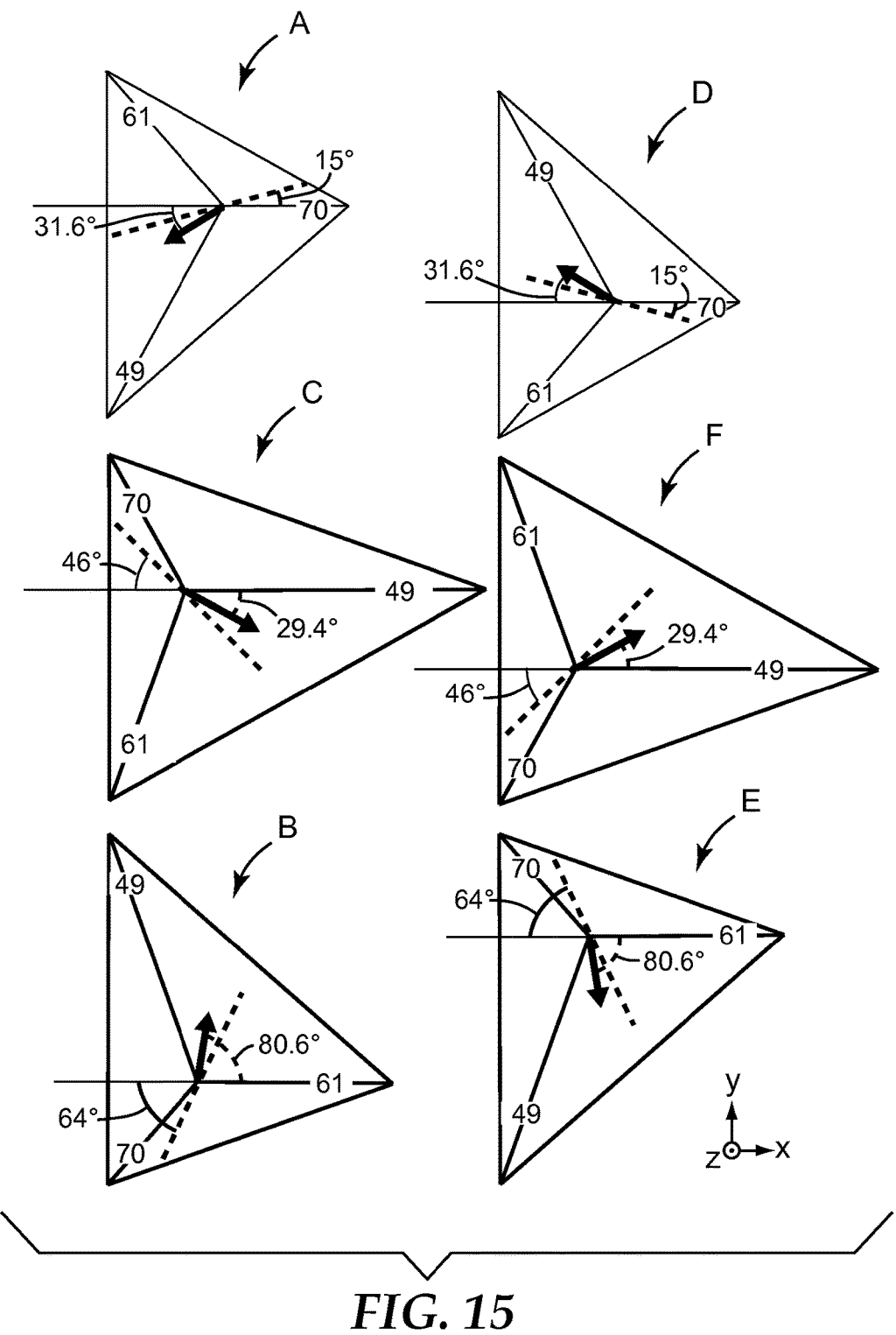
FIG. 15 is a schematic top or plan view of representative individual cube corner elements from the cube corner arrays of FIG. 14, the figure also showing planes of cant and primary planes of entrance angularity.

In FIG. 15, one cube corner from each of the tiles A, B, C, D, E, F of FIG. 14 is reproduced and enlarged, while maintaining its geometry and its orientation with respect to the in-plane y-axis. For simplicity, the cube corner from tile A of FIG. 14 is labeled A in FIG. 15, the cube corner from tile B of FIG. 14 is labeled B in FIG. 15, and so forth. In this figure, the thick black arrows representing the projection of the optical axes in the x-y plane, as well as the dashed lines representing the primary planes of entrance angularity, can be more easily seen than in FIG. 14.

Figure 16:
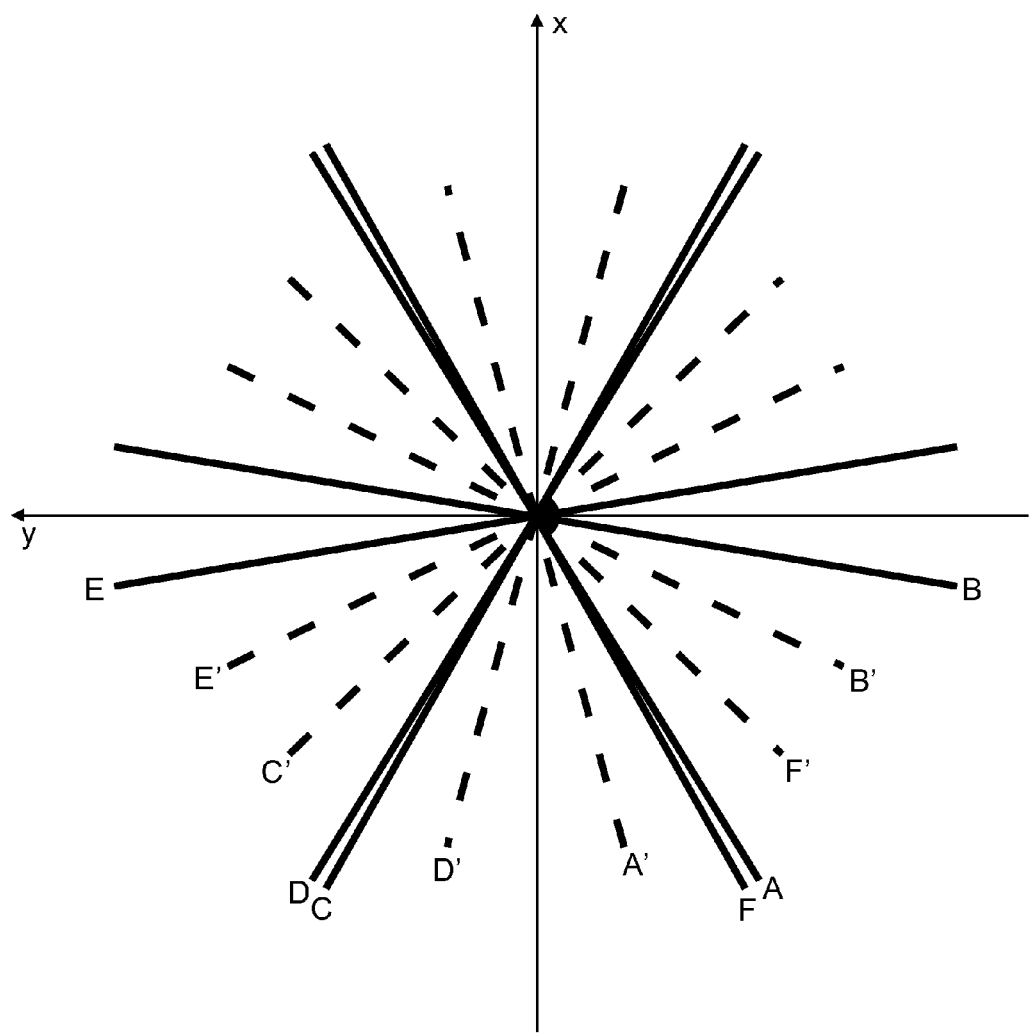
FIG. 16 is a schematic representation of the planes of cant and the primary planes of entrance angularity for the cube corner arrays of FIG. 14.

In FIG. 16, the planes of cant and the primary planes of entrance angularity for all of the tiles A, B, C, D, E, F of FIG. 14, and thus also for all of the cube corners A, B, C, D, E, F of FIG. 15, are shown superimposed on each other in relation to the x- and y-axes, these axes having their same meaning as in FIGS. 14 and 15. For each cube corner array (and corresponding tile), the solid line in FIG. 16 represents the plane of cant and its orientation with respect to the x- and y-axes, and the dashed line in FIG. 16 represents the primary plane of entrance angularity and its orientation with respect to the same x- and y-axes. These solid and dashed lines are labeled for simplicity with the letters A, B, C, D, E, F to correspond with the same labeling used in FIGS. 14 and 15. For example, the tile A in FIG. 14 and the cube A in FIG. 15 have a plane of cant represented by the solid line A in FIG. 16, and a primary plane of entrance angularity represented by the dashed line A in FIG. 16. The various planes of cant and primary planes of entrance angularity in FIG. 16 are thus representative of the tiled cube corner article 1410 and its constituent components (tiles). The length of the solid and dashed lines in FIG. 16 is arbitrary, but the solid lines are drawn to have a uniform length that is greater than the uniform length of the dashed lines, so the reader can more easily distinguish one from the other. Inspection of FIG. 16 reveals that the article 1410 is configured such that its constituent primary planes of entrance angularity are more evenly distributed in azimuthal angle than its constituent planes of cant.

For an article made by simply combining two of the articles 1410, duplicate planes of cant and duplicate primary planes of entrance angularity would appear in a representation like that of FIG. 16. To avoid double counting such planes, we may specify more generally that the tiled cube corner article is configured such that unique ones of the primary planes of entrance angularity for the plurality of tiles are more evenly distributed in azimuthal angle than unique ones of the planes of cant. To quantify the concept of "more evenly distributed in azimuthal angle", we may define an angle PhiMin1 as the minimum angular separation between unique ones of the primary planes of entrance angularity, and we may define PhiMin2 as the minimum angular separation between unique ones of the planes of cant. In FIG. 16, PhiMin1 is 18.00 degrees, and PhiMin2 is 2.23 degrees. We may also define an angle PhiMax1 as the maximum angular separation between unique ones of the primary planes of entrance angularity, and PhiMax2 as the maximum angular separation of unique ones of the planes of cant. In FIG. 16, PhiMax1 is 52.00 degrees, and PhiMax2 is 58.77 degrees. We may further define an angle PhiAvg1 as the average angular separation between unique ones of the primary planes of entrance angularity, and we may define PhiAvg2 as the average angular separation between unique ones of the planes of cant. In FIG. 16, PhiAvg1 and PhiAvg2 are the same, each being equal to 30.00 degrees. We may define an angular distribution metric ("PhiADM") equal to PhiAvg/(PhiMax−PhiMin). In FIG. 16, the angular distribution metric for the primary planes of entrance angularity is PhiADM1=0.882, and the angular distribution metric for the planes of cant is PhiADM2=0.531. Thus, to quantify the concept of "more evenly distributed in azimuthal angle", we may specify any one, or some (any combination of any two or more), or all of the following relationships:

PhiMin1>PhiMin2

PhiMin1≥2*PhiMin2

PhiMax1<PhiMax2

PhiADM1>PhiADM2

Several cube corner articles based on that shown in FIG. 14 were modeled. In a first case, the model assumed the same cube geometries discussed above, i.e., (49, 61, 70) for tiles A, B, and C, and (49, 70, 61) for tiles D, E, and F. The model further assumed the cube corners had a second order design feature to disperse light slightly from the direction of incident light, as discussed above with reference to the '219 Appeldorn patent. The second order design feature was to assume the groove angles were very slightly different from those that would produce dihedral angles between the cube corner facets of exactly 90 degrees, the difference in groove angle amounting to cube corner facets that deviated by 2 minutes of arc (0.033 degrees) relative to their nominal orientations that produce exact orthogonality. The model initially calculated the total light return (TLR) for each of the 6 cube corner arrays individually, assuming the cube corner article was composed of clear polycarbonate of refractive index 1.586, and assuming the cube corners were exposed to air and reflected light by total internal reflection. The TLR was calculated as a function of orientation angle for a sequence of different entrance angles. The model then calculated, for each combination of orientation angle and entrance angle, a weighted average of the TLRs for the 6 arrays. Weight values of 15% were used for the arrays of tiles B, C, E, and F, and weight values of 20% were used for the arrays of tiles A and D. These weight values are in proportion to the relative widths, and relative surface areas, of the respective tiles in the tiled article 1410.

Figure 17:
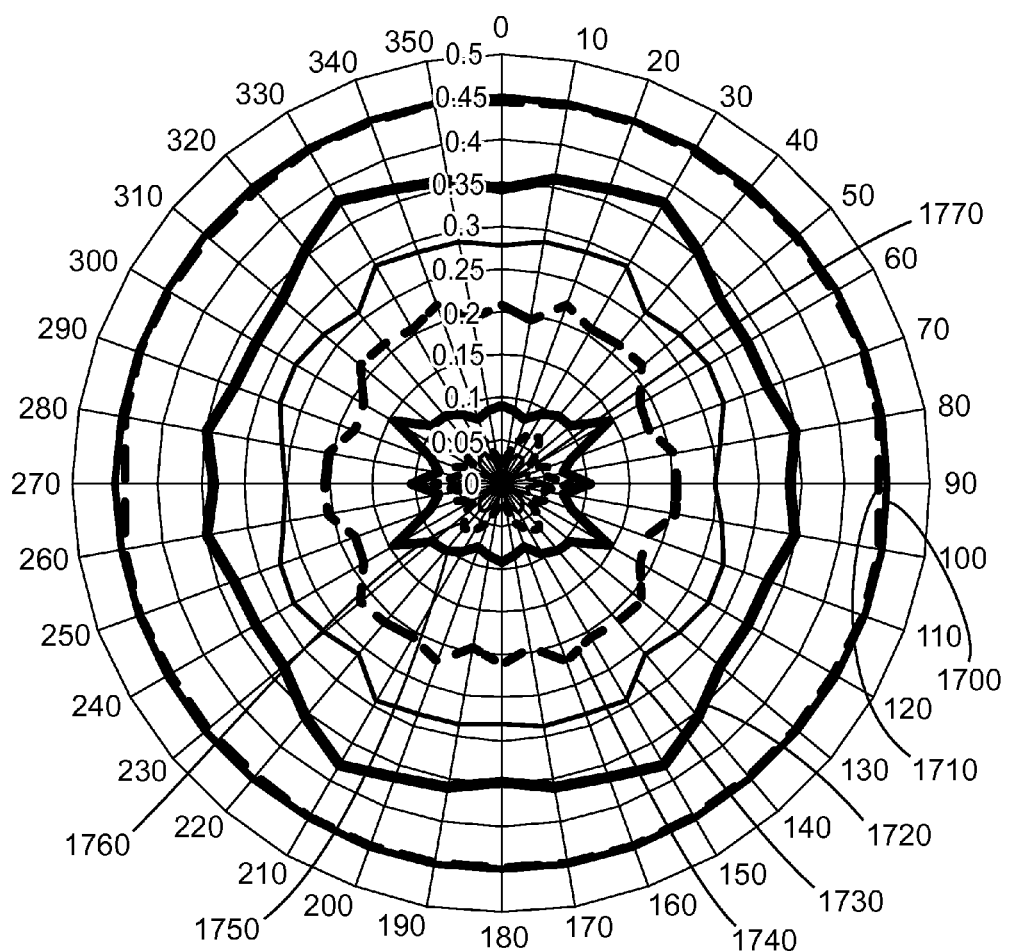
FIG. 17 is a graph of modeled TLR at various entrance angles for the retroreflective article of FIG. 14, assuming the article is composed of a material of refractive index 1.586.
Figure 18:
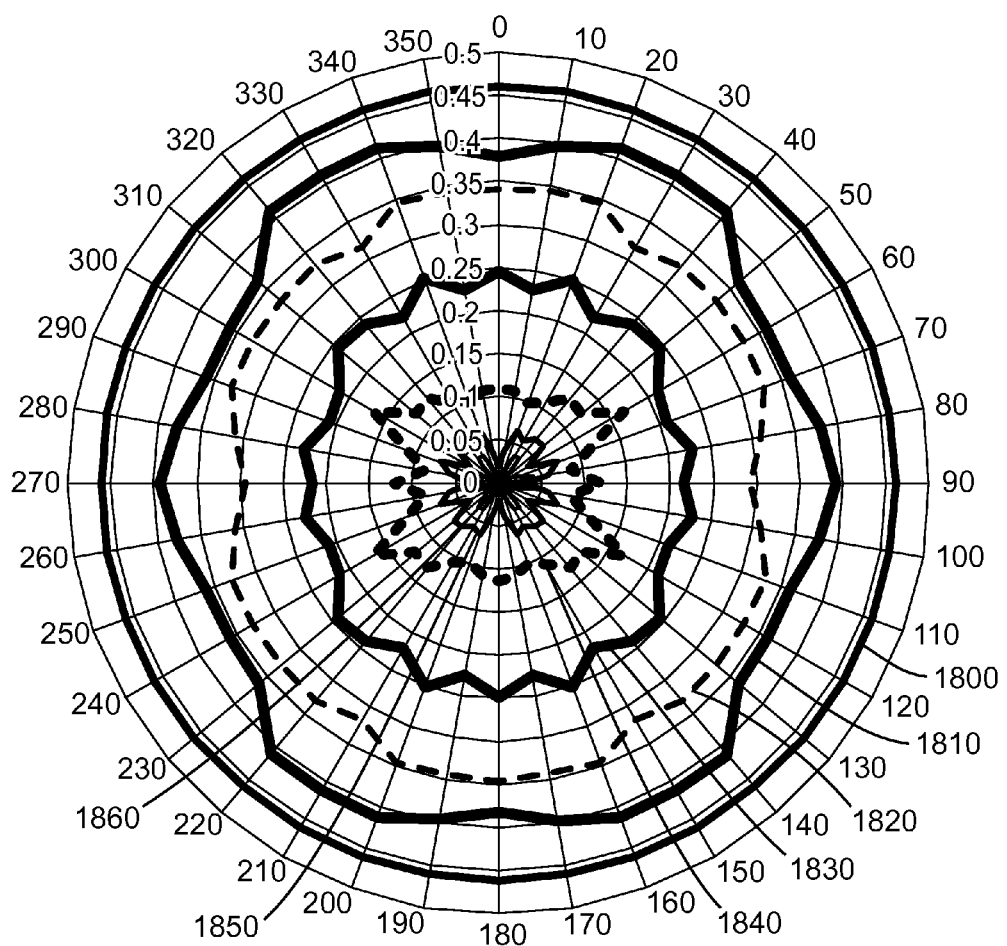
FIG. 18 is a modeled graph similar to that of FIG. 17, but wherein the article is assumed to be composed of a material of refractive index 1.5.

The resulting calculated retroreflective performance of the tiled retroreflective article is shown in the isointensity plot of FIG. 17. In the figure, the magnitude of the calculated TLR is in the radial direction, and orientation angle is in the azimuthal direction. Curves are plotted for entrance angles from 0 to 70 degrees in 10 degree increments, with curve 1700 representing a 0 degree entrance angle, curve 1710 representing a 10 degree entrance angle, curve 1720 representing a 20 degree entrance angle, and so forth. A second tiled cube corner article was then modeled. The article was assumed to be the same as that of FIG. 17, except that the refractive index was assumed to be 1.50 rather than 1.586. With this modification, the TLR of the tiled article was calculated in the same way as described above in connection with FIG. 17. The resulting calculated retroreflective performance is shown in the isointensity plot of FIG. 18, which has the same format as FIG. 17. Curves are plotted for entrance angles from 0 to 60 degrees in 10 degree increments, with curve 1800 representing a 0 degree entrance angle, curve 1810 representing a 10 degree entrance angle, curve 1820 representing a 20 degree entrance angle, and so forth. Some differences can be seen between these curves and the corresponding curves of FIG. 17. Such differences are demonstrative of the effect of a change in refractive index of the cube corner article.

Figure 2:
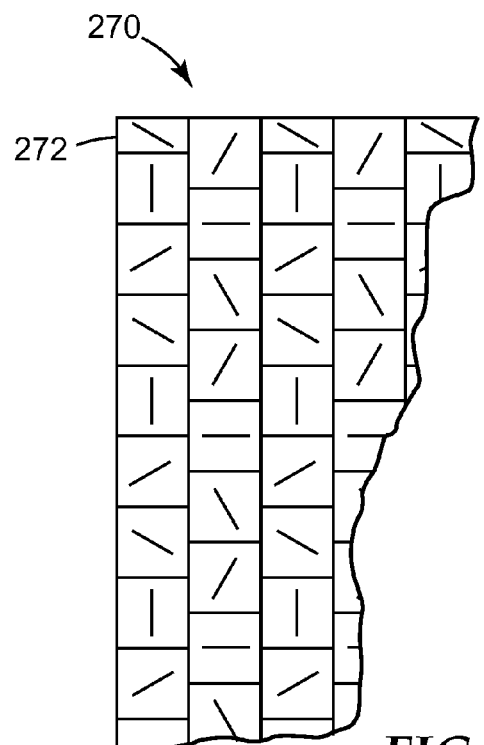
FIG. 2 is a schematic plan view of another tiled retroreflective sheeting that is known.
Figure 3:
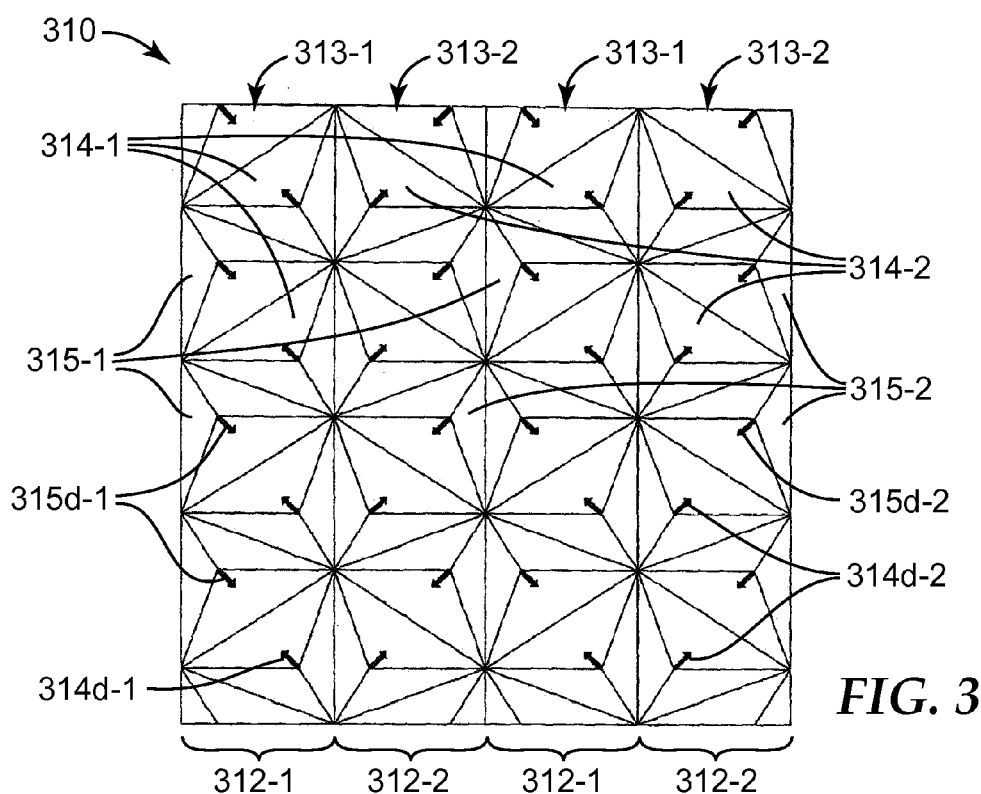
FIG. 3 is a multidirectional element group disclosed in a published patent application.
Figure 19:
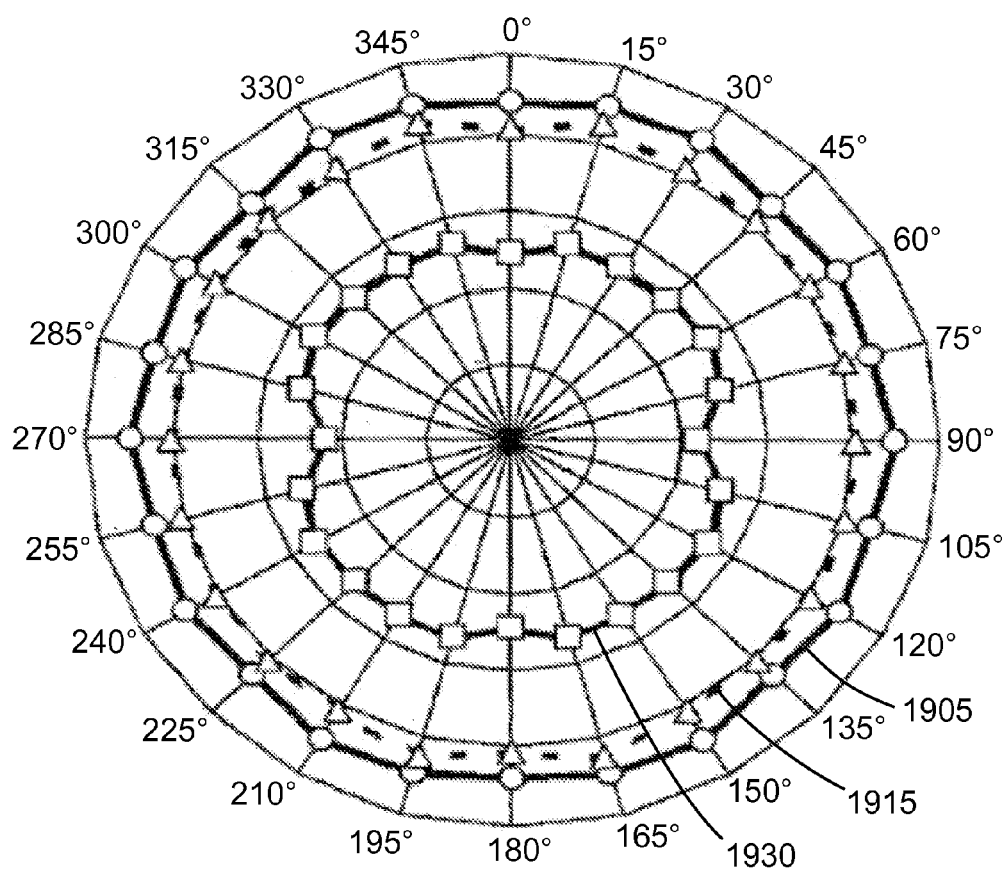
FIG. 19 is a graph from the above-mentioned published patent application relating to an optical simulation of the multidirectional element group of FIG. 3.

For comparison purposes, we also investigated the cube corner article shown in FIG. 3 above and discussed in the '281 Mimura publication. FIG. 19 is a reproduction of a figure in the '281 Mimura publication relating to the embodiment in which cube corners 314-1 and 315-1 have ordered base angles of (54.918, 66.659, 58.423), and cube corners 314-2 and 315-2 have ordered base angles of (54.918, 58.423, 66.659), this embodiment being referred to hereafter as the Mimura embodiment. The graph of FIG. 19 is said to be the retroreflective performance of this embodiment, as calculated using an optical simulation. The graph shows the performance at entrance angles of 5 degrees (curve 1905), 15 degrees (curve 1915), and 30 degrees (curve 1930), with data points plotted in orientation angle increments of 15 degrees.

Figure 20:
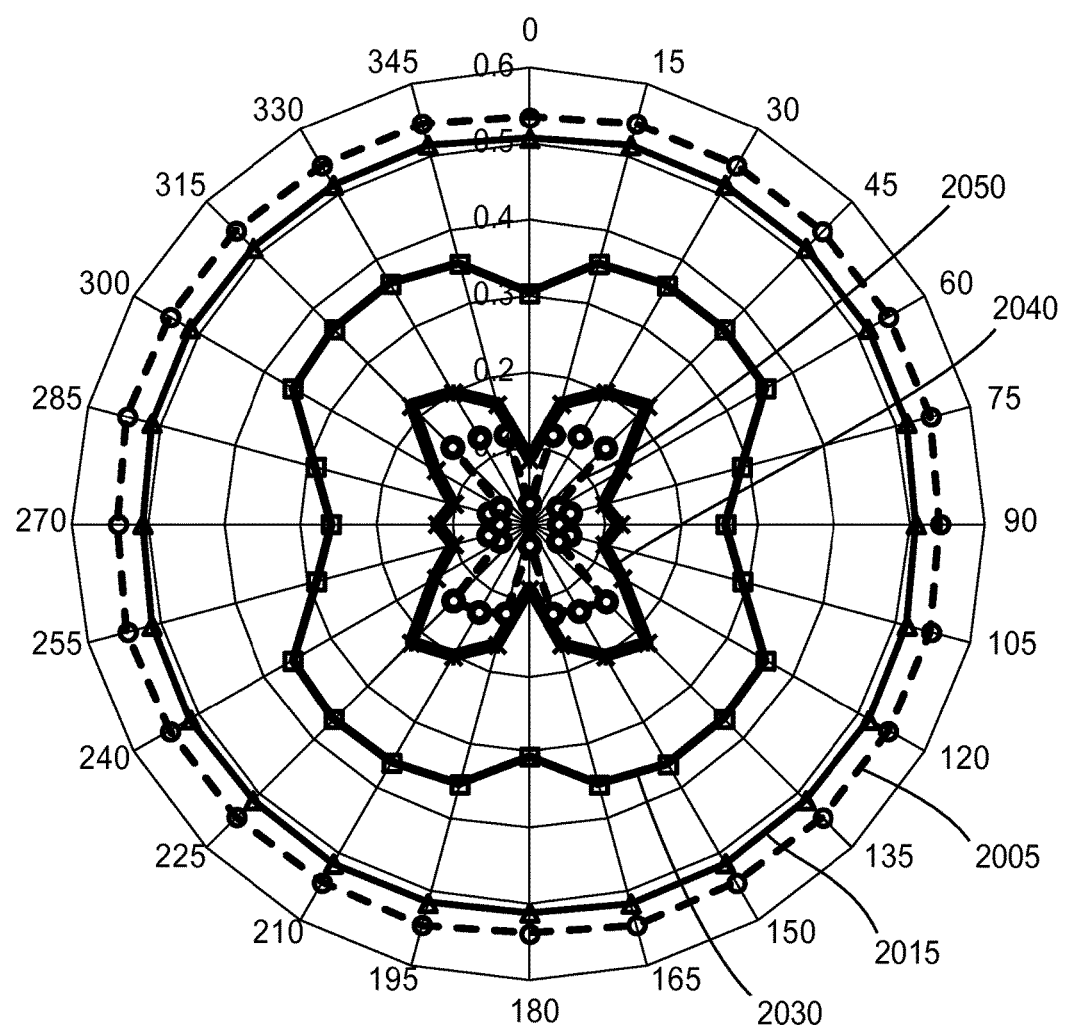
FIG. 20 is a graph of modeled TLR at various entrance angles for the structured surface of FIG. 3, assuming the article is composed of a material of refractive index 1.586.

We attempted to duplicate the results of Mimura in order to determine the retroreflective performance of the Mimura embodiment at entrance angles greater than 30 degrees. One obstacle in this effort was a lack of information in the '281 Mimura publication regarding the refractive index that was assumed for the embodiment. Using our own optical modeling software, we entered the cube corner geometrical information for the Mimura embodiment into our software, and generated isointensity plots of the TLR of the embodiment at a 5, 15, and 30 degree entrance angle for a number of different refractive indices. We then identified the refractive index that produced a curves that most closely matched those of FIG. 19, particularly curve 1930 at the 30 degree entrance angle. This procedure indicated to us the refractive index was equal to or approximately 1.586. FIG. 20 shows an isointensity plot which uses the TLR calculated by our optical modeling software for the Mimura embodiment, assuming the 1.586 refractive index. The graph shows the performance at entrance angles of 5 degrees (curve 2005), 15 degrees (curve 2015), 30 degrees (curve 2030), 40 degrees (curve 2040), and 50 degrees (curve 2050), with data points plotted in orientation angle increments of 15 degrees just as in FIG. 19. Curve 2030 can be seen to closely approximate the curve 1930 in FIG. 19. Inspection of FIG. 20, particularly curves 2040 and 2050 thereof, reveals that uniformity as a function of orientation angle rapidly degrades for the Mimura embodiment at increased entrance angles.

Figure 21:
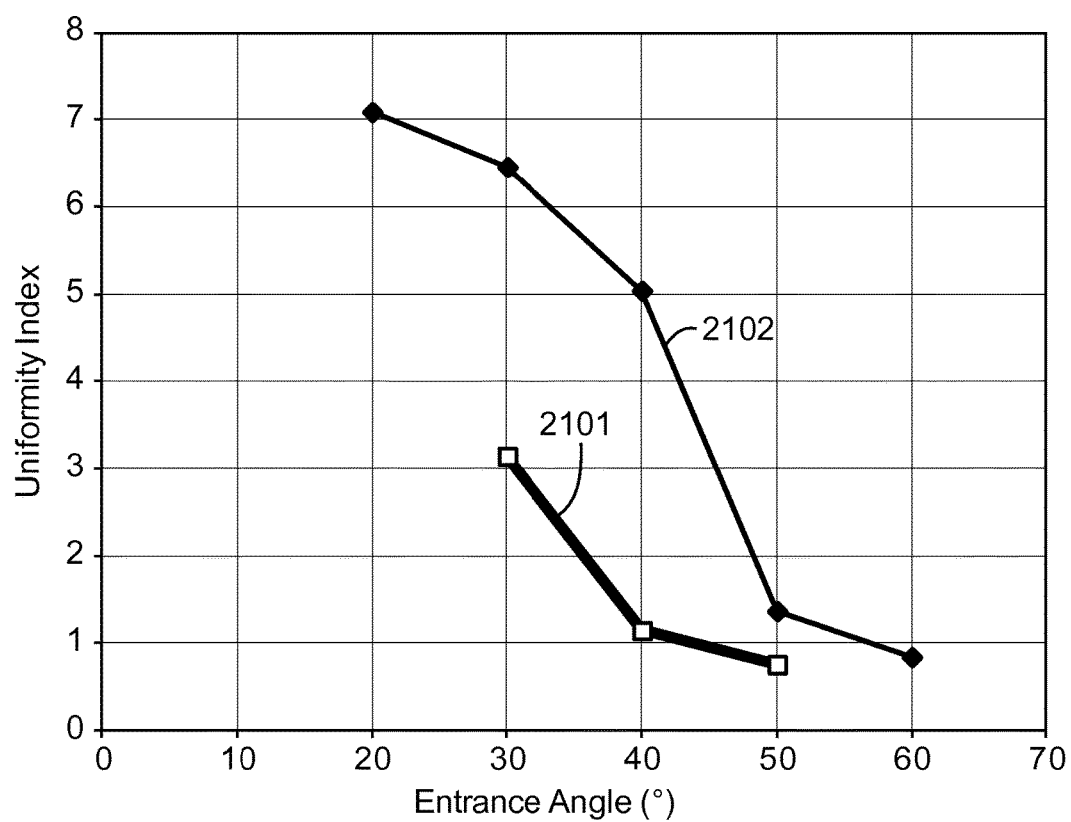
FIG. 21 is a graph in which data from FIGS. 17 and 20 is replotted as a uniformity index as a function of entrance angle.

The uniformity index UI discussed above was calculated for the Mimura embodiment, assuming the 1.586 refractive index, and for the embodiment of FIG. 17 (see also FIGS. 14, 15, and 16), which has the same refractive index. The results are shown in FIG. 21. In that figure, curve 2101 is the UI for the Mimura embodiment, and curve 2102 is for the embodiment of FIG. 17.

Exemplary materials for forming retroreflective cube corner articles include, but are not limited to, thermoplastic polymers such as, for example, poly(carbonate), poly(methylmethacrylate), poly(ethyleneterephthalate), aliphatic polyurethanes, as well as ethylene copolymers and ionomers thereof, and mixtures thereof. Cube corner sheeting may be prepared by casting directly onto a film, such as described in U.S. Pat. No. 5,691,846 (Benson, Jr. et al.). Polymers for radiation cured cube corners include crosslinked acrylates such as multifunctional acrylates or epoxies, acrylated urethanes blended with mono- and multifunctional monomers, and nitrogen-containing polymers, such as those described in U.S. Pat. No. 7,862,187 (Thakkar et al.), incorporated herein by reference. Further, cube corners such as those previously described may be cast on to plasticized polyvinyl chloride film for more flexible cast cube corner sheeting. These polymers are desirable for one or more reasons including thermal stability, environmental stability, clarity, excellent release from the tooling or mold, and the ability to apply a reflective coating to the cube corner facets.

A specularly reflective coating or reflective layer may be placed on the facets of the cube corner elements (e.g. on a back side of a cube corner film) to promote retroreflection. Suitable reflective coatings include metallic coatings such as aluminum, silver, nickel, or alloys thereof, which can be applied by known techniques such as vapor deposition or chemical deposition. A reflective layer may also be or comprise a multilayer optical film. A primer layer may be applied to the cube corner facets to promote adherence of the reflective coating or layer. In cases where no reflective coating or layer is used on the cube corner facets, they may be exposed to air or vacuum, and a sealing film may be used to provide sealed cells or pockets that maintain the air interface and keep out water, dirt, and the like. Exemplary seal films for retroreflective articles are disclosed in U.S. Pat. No. 7,611,251 (Thakkar et al.). In other embodiments, a pressure sensitive adhesive layer comprising barrier materials may be disposed on the cube corners, such as disclosed, for example, in patent application publication US 2013/0034682 (Free et al.).

Prismatic retroreflective sheeting can be manufactured as an integral material, e.g., by embossing a preformed sheet with a structured surface containing cube corner array(s), or by casting a fluid material into a suitable mold. Alternatively, retroreflective sheeting can be manufactured as a layered product by casting the cube corner elements against a preformed film or by laminating a preformed film to preformed cube corner elements. The cube corner elements can be formed on a polycarbonate film approximately 0.5 mm thick having an index of refraction of about 1.59. Useful materials for making retroreflective sheeting are materials that are dimensionally stable, durable, weatherable, and readily formable into the desired configuration. Generally any optically transmissive material that is formable, typically under heat and pressure, can be used. The sheeting can also include colorants, dyes, UV absorbers or separate UV absorbing layers, and other additives as desired.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations. Similarly, terms such as "equal", "parallel", "coincide", and the like when used herein should be understood to encompass embodiments in which deviations from exact equality, parallelism, coincidence, etc., are within manufacturing tolerances, or otherwise deviate from such exactness due to second order design features as discussed elsewhere herein.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

This document discloses numerous embodiments, including but not limited to the following items:

Item 1 is an article having a structured surface that defines a reference plane having an in-plane axis, the structured surface including a plurality of cube corner arrays arranged into a plurality of tiles, the article comprising:
  first, second, and third tiles defined by respective first, second, and third cube corner arrays, the first, second, and third cube corner arrays having respective first, second, and third primary planes of entrance angularity, each oriented differently relative to the in-plane axis;
  wherein the first, second, and third tiles each includes one tile edge parallel to the in-plane axis; and
  wherein each of the first, second, and third cube corner arrays includes one given groove parallel to the in-plane axis.

Item 2 is the article of item 1, where the first, second, and third tiles are each elongated parallel to the in-plane axis.

Item 3 is the article of item 1, wherein for each of the first, second, and third tiles, the given groove is one of a plurality of lengthwise grooves that define a lengthwise groove pitch, and each of the first, second, and third tiles has a width equal to an integer multiple of the respective lengthwise groove pitch.

Item 4 is the article of item 3, wherein the widths of the first, second, and third tiles are each in a range from 0.2 mm to 5 mm, or from 0.2 mm to 1 mm, or from 0.5 mm to 1 mm.

Item 5 is the article of item 1, wherein the plurality of tiles includes additional tiles other than the first, second, and third tiles, the additional tiles having corresponding additional cube corner arrays, all of the additional cube corner arrays including one given groove parallel to the in-plane axis.

Item 6 is the article of item 1, wherein cube corners in each of the first, second, and third cube corner arrays are canted and characterized by a base triangle having an ordered set of base angles, and wherein the ordered sets of base angles for the first and second cube corner arrays are equal to each other, and the ordered sets of base angles for the first and third cube corner arrays are permutations of each other.

Item 7 is the article of item 1, wherein cube corners in each of the first, second, and third cube corner arrays are canted and characterized by a base triangle having an ordered set of base angles, and wherein the ordered sets of base angles for the first, second, and third cube corner arrays are equal to each other.

Item 8 is the article of item 7, wherein the plurality of tiles further includes a fourth tile defined by a fourth cube corner array, the fourth cube corner array having a fourth primary plane of entrance angularity that is not parallel to any of the first, second, or third primary planes of entrance angularity, and wherein cube corners in the fourth cube corner array are canted and characterized by a base triangle having an ordered set of base angles that is a permutation of the ordered set of base angles for the first cube corner array.

Item 9 is the article of item 8, wherein the fourth tile is elongated parallel to the in-plane axis, and the fourth cube corner array includes one lengthwise groove parallel to the in-plane axis.

Item 10 is the article of item 1, wherein all of the cube corner arrays in the plurality of cube corner arrays have respective primary planes of entrance angularity, the primary planes of entrance angularity defining at least 4 unique orientations relative to the in-plane axis.

Item 11 is the article of item 10, wherein the cube corner arrays associated with the at least 4 unique orientations each includes one lengthwise groove parallel to the in-plane axis and are characterized by respective ordered sets of base angles, every two of such ordered sets of base angles either being equal to each other or being permutations of each other.

Item 12 is the article of item 10, wherein the primary planes of entrance angularity define at least 5 unique orientations relative to the in-plane axis.

Item 13 is the article of item 12, wherein the cube corner arrays associated with the at least 5 unique orientations are characterized by respective ordered sets of base angles, every two of such ordered sets of base angles either being equal to each other or being permutations of each other.

Item 14 is the article of item 12, wherein the primary planes of entrance angularity define at least 6 unique orientations relative to the in-plane axis.

Item 15 is the article of item 14, wherein the cube corner arrays associated with the at least 6 unique orientations are characterized by respective ordered sets of base angles, every two of such ordered sets of base angles either being equal to each other or being permutations of each other.

Item 16 is the article of item 1, wherein the first and second tiles have tile edges that meet along a boundary, and wherein facets of a row of cube corners on the first tile near the boundary and facets of a row of cube corners on the second tile near the boundary collectively form a composite groove, the composite groove being parallel to the in-plane axis.

Item 17 is the article of item 16, wherein the composite groove has a composite groove angle that differs from a groove angle of the given groove of the first cube corner array and that also differs from a groove angle of the given groove of the second cube corner array.

Item 18 is the article of item 1, wherein the structured surface provides a uniformity index at a 30 degree entrance angle of at least 4, or at least 5, or at least 6.

Item 19 is the article of item 1, wherein the structured surface provides a uniformity index at a 40 degree entrance angle of at least 2, or at least 3, or at least 4, or at least 5.

Item 20 is an article having a structured surface that includes a plurality of cube corner arrays arranged into a corresponding plurality of tiles, the structured surface defining a reference plane having an in-plane axis, the cube corner array for each of the plurality of tiles having a given groove set whose grooves extend parallel to the in-plane axis, the cube corner array for each of the plurality of tiles having associated therewith a plane of cant and a primary plane of entrance angularity, and wherein unique ones of the primary planes of entrance angularity for the plurality of tiles are more evenly distributed in azimuthal angle than unique ones of the planes of cant.

Item 21 is the article of item 20, wherein the unique ones of the primary planes of entrance angularity have a minimum angular separation PhiMin1 and the unique ones of the planes of cant have a minimum angular separation PhiMin2, and wherein PhiMin1 is greater than PhiMin2.

Item 22 is the article of item 21, wherein PhiMin1 is at least 2 times PhiMin2

Item 23 is the article of item 20, wherein the tiles have respective widths that are in a range from 0.2 mm to 5 mm.

Item 24 is the article of item 20, wherein the given groove set for each tile is a lengthwise groove set for such tile.

Item 25 is the article of item 20, wherein the structured surface has N unique primary planes of entrance angularity associated respectively with N unique ones of the cube corner arrays, and wherein N is 4, 5, or 6.

Item 26 is the article of item 20, wherein the plurality of tiles includes a first, second, and third tile comprising respective first, second, and third arrays of canted cube corners, the first, second, and third arrays having associated therewith respective first, second, and third planes of cant no two of which are parallel to each other.

Item 27 is the article of item 26, wherein for each of the first, second, and third arrays, the given groove set is a lengthwise groove set that defines a lengthwise groove pitch, and each of the first, second, and third tiles has a width equal to an integer multiple of the respective lengthwise groove pitch.

Item 28 is the article of item 20, wherein the structured surface provides a uniformity index at a 30 degree entrance angle of at least 4, or at least 5, or at least 6.

Item 29 is the article of item 20, wherein the structured surface provides a uniformity index at a 40 degree entrance angle of at least 2, or at least 3, or at least 4, or at least 5.

Item 30 is the article of item 20, wherein the plurality of tiles are each elongated parallel to the in-plane axis.

Item 31 is an article having a structured surface, the structured surface being segmented into a plurality of tiles, the article comprising:
  a first, second, and third tile comprising respective first, second, and third arrays of canted cube corners, the first, second, and third arrays having associated therewith respective first, second, and third planes of cant no two of which are parallel to each other;
  wherein cube corners in the first, second, and third arrays are characterized by base triangles having respective first, second, and third ordered sets of base angles;
  wherein the first and second ordered sets of base angles are equal to each other; and
  wherein the first and third ordered sets of base angles are permutations of each other.

Item 32 is the article of item 31, wherein each of the first, second, and third arrays has a groove set whose grooves extend parallel to an edge of its respective tile.

Item 33 is the article of item 31, wherein each of the first, second, and third arrays is defined by three sets of parallel grooves that intersect each other to form cube corners.

Item 34 is the article of item 31, further comprising:
  a fourth tile comprising a fourth array of canted cube corners, the fourth array having associated therewith a fourth plane of cant that is not parallel to any of the first, second, or third planes of cant.

Item 35 is the article of item 34, wherein the fourth array is characterized by a base triangle having a fourth ordered set of base angles, the fourth ordered set of base angles being the same as the third ordered set of base angles.

Item 36 is the article of item 31, wherein the structured surface provides a uniformity index at a 30 degree entrance angle of at least 4, or at least 5, or at least 6.

Item 37 is the article of item 31, wherein the structured surface provides a uniformity index at a 40 degree entrance angle of at least 2, or at least 3, or at least 4, or at least 5.

What is claimed is:

1. An article having a structured surface that defines a reference plane having an in-plane axis, the structured surface including a plurality of cube corner arrays arranged into a plurality of tiles, the article comprising:
   first, second, and third tiles defined by respective first, second, and third cube corner arrays, the first, second, and third cube corner arrays having respective first, second, and third primary planes of entrance angularity, each oriented differently relative to the in-plane axis;
   wherein the first, second, and third tiles each includes one tile edge parallel to the in-plane axis; and
   wherein each of the first, second, and third cube corner arrays includes one given groove parallel to the in-plane axis.

2. The article of claim 1, where the first, second, and third tiles are each elongated parallel to the in-plane axis.

3. The article of claim 1, wherein for each of the first, second, and third tiles, the given groove is one of a plurality of lengthwise grooves that define a lengthwise groove pitch, and each of the first, second, and third tiles has a width equal to an integer multiple of the respective lengthwise groove pitch.

4. The article of claim 1, wherein the plurality of tiles includes additional tiles other than the first, second, and third tiles, the additional tiles having corresponding additional cube corner arrays, all of the additional cube corner arrays including one given groove parallel to the in-plane axis.

5. The article of claim 1, wherein cube corners in each of the first, second, and third cube corner arrays are canted and characterized by a base triangle having an ordered set of base angles, and wherein the ordered sets of base angles for the first and second cube corner arrays are equal to each other, and the ordered sets of base angles for the first and third cube corner arrays are permutations of each other.

6. The article of claim 1, wherein cube corners in each of the first, second, and third cube corner arrays are canted and characterized by a base triangle having an ordered set of base angles, and wherein the ordered sets of base angles for the first, second, and third cube corner arrays are equal to each other.

7. The article of claim 6, wherein the plurality of tiles further includes a fourth tile defined by a fourth cube corner array, the fourth cube corner array having a fourth primary plane of entrance angularity that is not parallel to any of the first, second, or third primary planes of entrance angularity, and wherein cube corners in the fourth cube corner array are canted and characterized by a base triangle having an ordered set of base angles that is a permutation of the ordered set of base angles for the first cube corner array.

8. The article of claim 7, wherein the fourth tile is elongated parallel to the in-plane axis, and the fourth cube corner array includes one lengthwise groove parallel to the in-plane axis.

9. The article of claim 1, wherein all of the cube corner arrays in the plurality of cube corner arrays have respective primary planes of entrance angularity, the primary planes of entrance angularity defining at least 4 unique orientations relative to the in-plane axis.

10. The article of claim 9, wherein the cube corner arrays associated with the at least 4 unique orientations each include one lengthwise groove parallel to the in-plane axis and are characterized by respective ordered sets of base angles, every two of such ordered sets of base angles either being equal to each other or being permutations of each other.

11. The article of claim 1, wherein the first and second tiles have tile edges that meet along a boundary, and wherein facets of a row of cube corners on the first tile near the boundary and facets of a row of cube corners on the second tile near the boundary collectively form a composite groove, the composite groove being parallel to the in-plane axis.

12. The article of claim 11, wherein the composite groove has a composite groove angle that differs from a groove angle of the given groove of the first cube corner array and that also differs from a groove angle of the given groove of the second cube corner array.

* * * * *